(12) United States Patent
Mitsuda et al.

(10) Patent No.: US 8,906,525 B2
(45) Date of Patent: Dec. 9, 2014

(54) ENERGY STORAGE DEVICE CELL

(75) Inventors: Kenro Mitsuda, Tokyo (JP); Makiko Kise, Tokyo (JP); Shoji Yoshioka, Tokyo (JP); Shigeru Aihara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 422 days.

(21) Appl. No.: 13/287,383

(22) Filed: Nov. 2, 2011

(65) Prior Publication Data
US 2012/0114982 A1 May 10, 2012

(30) Foreign Application Priority Data

Nov. 4, 2010 (JP) ................................. 2010-247534
Oct. 3, 2011 (JP) ................................. 2011-219306

(51) Int. Cl.
*H01M 12/00* (2006.01)
*H01M 2/26* (2006.01)
(Continued)

(52) U.S. Cl.
CPC ................. *H01G 9/058* (2013.01); *H01M 2/26* (2013.01); *H01M 4/64* (2013.01); *Y02E 60/12* (2013.01); *Y02T 10/7011* (2013.01);
(Continued)

(58) Field of Classification Search
USPC .......................................................... 429/9
See application file for complete search history.

(56) References Cited

U.S. PATENT DOCUMENTS

2007/0015061 A1* 1/2007 Klaassen ....................... 429/322
2007/0029368 A1* 2/2007 Kubouchi et al. .......... 228/112.1
(Continued)

FOREIGN PATENT DOCUMENTS

JP 02-098914 A 4/1990
JP 07-142062 A 6/1995
(Continued)

OTHER PUBLICATIONS

Office Action issued Apr. 8, 2014 in Japanese Patent Application No. 2011-219306 (with English language translation).

*Primary Examiner* — Muhammad Siddiquee
(74) *Attorney, Agent, or Firm* — Oblon, Spivak, McClelland, Maier & Neustadt, L.L.P.

(57) ABSTRACT

Provided is an energy storage device cell capable of enhancing energy density. The energy storage device cell includes: a battery main body including battery anode plate members and battery cathode plate members, in which the battery cathode plate members are placed at both ends in a stack direction; common anode plate members each including a common anode collector foil having a through-hole formed therein and common anode electrode layers, the common anode plate members being stacked on the battery cathode plate members placed at both ends in the stack direction of the battery main body; capacitor cathode plate members each including a capacitor cathode collector foil and a capacitor cathode electrode layer, in which the capacitor cathode electrode layer is placed between the common anode plate member and the capacitor cathode collector foil.

8 Claims, 14 Drawing Sheets

(51) Int. Cl.
  *H01M 4/64* (2006.01)
  *H01M 10/0525* (2010.01)
  *H01M 10/058* (2010.01)
  *H01G 9/04* (2006.01)
  *H01M 4/13* (2010.01)
  *H01M 10/0585* (2010.01)
  *H01M 4/70* (2006.01)
  *H01G 9/00* (2006.01)
  *H01M 10/0587* (2010.01)

(52) U.S. Cl.
  CPC ........ *H01M 10/0525* (2013.01); *H01M 10/058* (2013.01); *Y02E 60/122* (2013.01); *H01M 4/13* (2013.01); *H01M 10/0585* (2013.01); *H01M 4/70* (2013.01); *H01G 9/155* (2013.01); *H01M 10/0587* (2013.01)
  USPC ............................................................ 429/9

(56) References Cited

U.S. PATENT DOCUMENTS

| | | | |
|---|---|---|---|
| 2009/0147442 A1* | 6/2009 | Hiroi et al. | 361/502 |
| 2009/0148759 A1* | 6/2009 | Mitsuda et al. | 429/142 |
| 2010/0027195 A1* | 2/2010 | Taguchi et al. | 361/527 |
| 2010/0209779 A1* | 8/2010 | Wendman | 429/310 |

FOREIGN PATENT DOCUMENTS

| | | |
|---|---|---|
| JP | 2007-012391 A | 1/2007 |
| JP | 2008-159315 A | 7/2008 |
| JP | 2009-026480 A | 2/2009 |
| JP | 2009-141114 | 6/2009 |
| JP | 2009-141181 | 6/2009 |
| JP | 2009-545875 | 12/2009 |

* cited by examiner

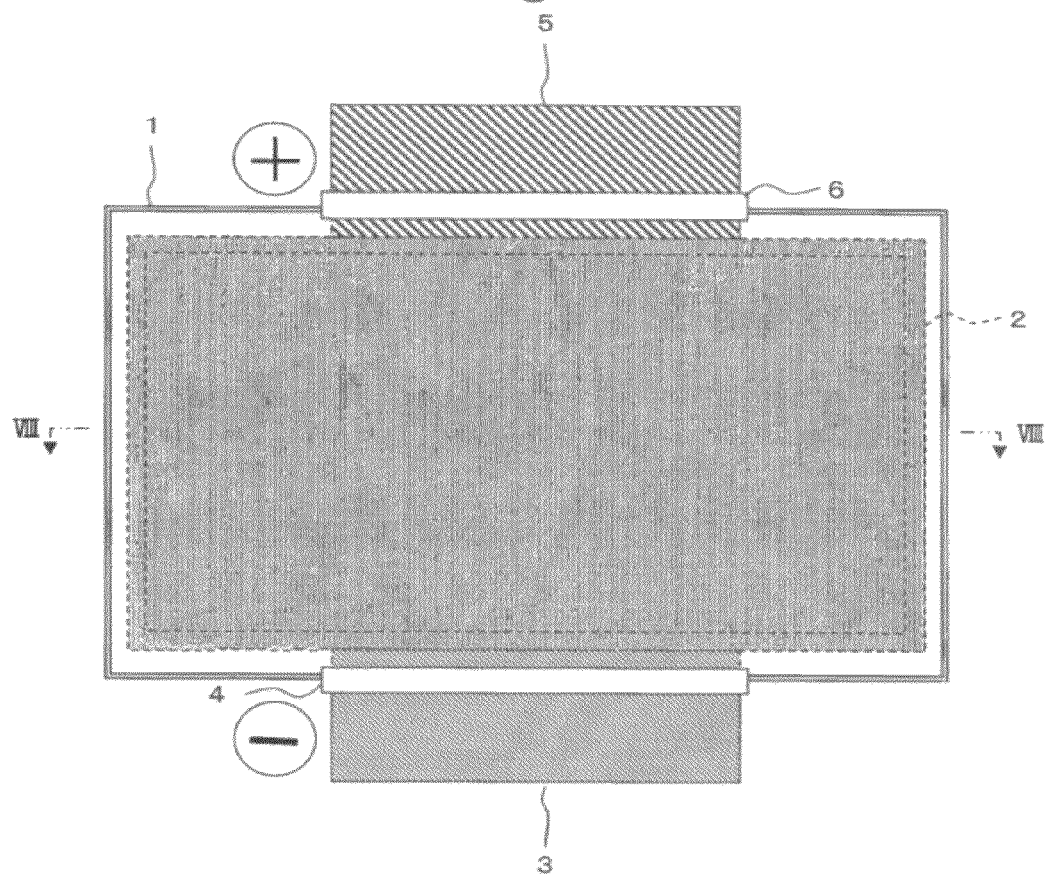
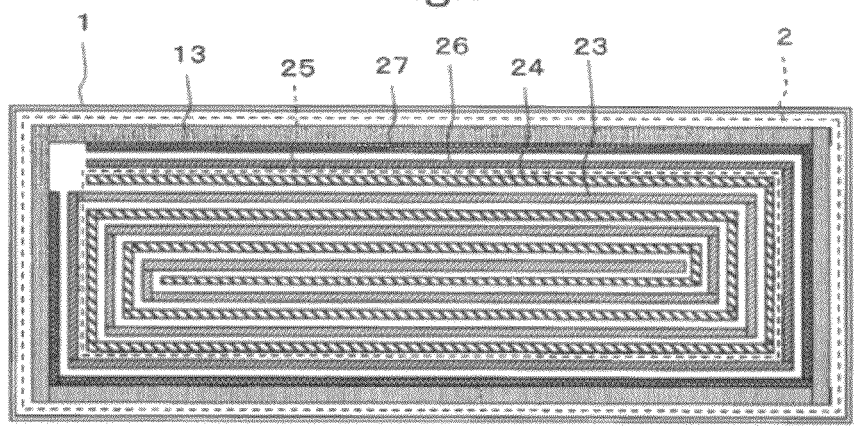

Fig.15
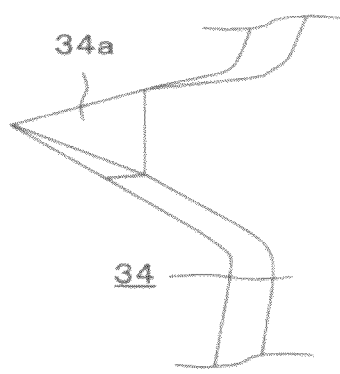
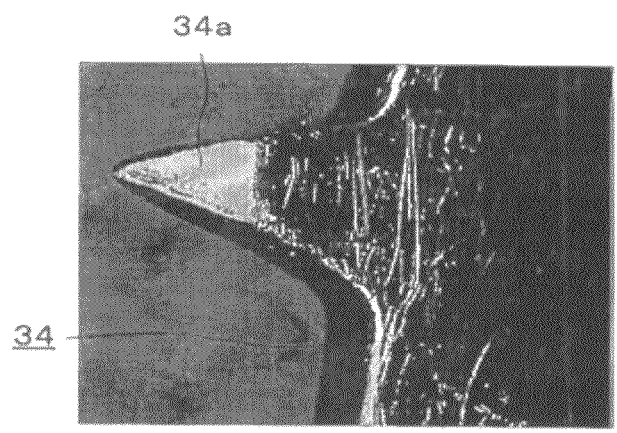
Fig.16
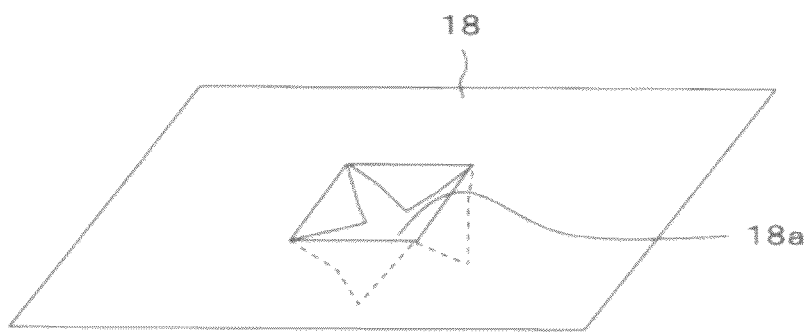

ENERGY STORAGE DEVICE CELL

BACKGROUND OF THE INVENTION

1. Field of the Invention

The present invention relates to an energy storage device cell containing a combined configuration of a lithium ion battery and a lithium ion capacitor.

2. Description of the Related Art

Examples of an energy storage device cell include an electric double layer capacitor, a lithium ion battery (LIB), and a lithium ion capacitor (LIC). The electric double layer capacitor (also referred to simply as capacitor, supercapacitor, electrochemical capacitor, etc.) includes polarized electrodes (cathode and anode) opposed to each other with a separator interposed therebetween and utilizes a capacitance of an electric double layer formed on the surface of the polarized electrodes in an electrolyte solution. The lithium ion battery has a feature of being capable of charging and storing lithium in a carbon anode stably, and an oxide containing cobalt, nickel, manganese, or the like is used as a cathode.

The lithium ion capacitor has been developed as a hybrid type of the electric double layer capacitor and the lithium ion battery. The lithium ion capacitor includes a cathode of the electric double layer capacitor and an anode of the lithium ion battery. The lithium ion capacitor may obtain a voltage higher than that of the electric double layer capacitor, but has a drawback in that it is difficult to set a lower limit voltage to 0 V.

The electric double layer capacitor does not have an instantaneous power comparable to that of an aluminum electrolytic capacitor. However, the electric double layer capacitor has an advantage in that the power density of energy is large and charging and discharging can be performed in a short period of time. On the other hand, of all the energy storage device cells, the lithium ion battery has overwhelmingly high energy density, namely sustainability. If an energy storage device cell having both the instantaneous power of the electric double layer capacitor and the sustainability of the lithium ion battery can be realized, an energy storage device cell can be used for various applications, such as brake regeneration of a hybrid automobile.

Conventionally, as an energy storage device cell containing a combined configuration of a lithium ion battery and a lithium ion capacitor, there is known an energy storage device cell in which a lithium ion capacitor cathode, a common anode, and a lithium ion battery cathode are stacked in this order, and separators are provided respectively between the lithium ion capacitor cathode and the common electrode and between the common anode and the lithium ion battery cathode.

The common anode includes an anode collector foil having through-holes formed therein and an anode electrode layer applied to one surface of the anode collector foil. The anode collector layer is placed between the lithium ion capacitor cathode and the anode collector foil. The lithium ion capacitor cathode includes a capacitor cathode collector foil and a capacitor cathode electrode layer applied to one surface of the capacitor cathode collector foil. The capacitor cathode electrode layer is placed between the common anode and the capacitor cathode collector foil. The lithium ion battery cathode includes a battery cathode collector foil and a battery cathode electrode layer applied to one surface of the battery cathode collector foil. The battery cathode electrode layer is placed between the common anode and the battery cathode collector foil (see, for example, Japanese Patent Application Laid-open No. 2009-141181).

In the conventional energy storage device cell, both the sustainability of the lithium ion battery and the instantaneous power of the lithium ion capacitor can be utilized. Further, after the lithium ion capacitor portion once receives a current during rapid charging, the current flows through the lithium ion battery portion. Therefore, the lithium ion battery portion during rapid charging can be prevented from being degraded, which can prolong the cycle life of the lithium ion battery portion.

However, the area of the capacitor cathode electrode layer is the same as that of the battery cathode electrode layer, and hence a region occupied by the lithium ion battery portion in the entire energy storage device cell is small. Thus, there has been a problem that the energy density of the energy storage device cell is low.

SUMMARY OF THE INVENTION

It is an object of the present invention to provide an energy storage device cell capable of enhancing energy density.

An energy storage device cell according to the present invention includes: a lithium ion battery main body including: a lithium ion battery anode portion including a battery anode collector foil and battery anode electrode layers provided on both surfaces of the battery anode collector foil; and a lithium ion battery cathode portion including a battery cathode collector foil and battery cathode electrode layers provided on both surfaces of the battery cathode collector foil, the lithium ion battery anode portion and the lithium ion battery cathode portion are stacked alternately in a plurality of numbers so that the lithium ion battery cathode portion is placed at an end in a stack direction of the lithium ion battery main body; a common anode portion including a common anode collector foil having a through-hole formed therein and common anode electrode layers provided on both surfaces of the common anode collector foil, the common anode portion being stacked on the lithium ion battery cathode portion placed at the end in the stack direction of the lithium ion battery main body; a lithium ion capacitor cathode portion including a capacitor cathode collector foil and a capacitor cathode electrode layer provided on the capacitor cathode collector foil, the lithium ion capacitor cathode portion being stacked on the common anode portion so that the capacitor cathode electrode layer is placed between the common anode portion and the capacitor cathode collector foil; separators provided respectively between the lithium ion battery anode portion and the lithium ion battery cathode portion, between the lithium ion battery cathode portion and the common anode portion, and between the common anode portion and the lithium ion capacitor cathode portion; and a container containing the lithium ion battery main body, the common anode portion, the lithium ion capacitor cathode portion, and the separators, in which the battery anode collector foil and the common anode collector foil are connected to each other electrically, and the battery cathode collector foil and the capacitor cathode collector foil are connected to each other electrically.

According to the energy storage device cell of the present invention, the area of the battery cathode electrode layer can be set to be larger than that of the capacitor cathode electrode layer. Therefore, a region that the lithium ion battery portion occupies in the entire energy storage device cell can be enlarged. As a result, the energy density of the energy storage device cell can be enhanced.

BRIEF DESCRIPTION OF THE DRAWINGS

In the accompanying drawings:

FIG. 7 is a front view illustrating an energy storage device cell according to a fifth embodiment of the present invention;

FIG. 8 is a cross-sectional view taken along the line VIII-VIII of FIG. 7;

FIG. 15 is a perspective view and a photograph showing a cutting tooth roll for forming through-holes of a common anode collector foil, and through-holes and concave portions of a common anode electrode layer of FIG. 12;

FIG. 16 is a perspective view illustrating a common anode collector foil in which through-holes are formed by the cutting tooth roll of FIG. 15;

DETAILED DESCRIPTION OF THE PREFERRED EMBODIMENTS

First Embodiment

Figure 1:
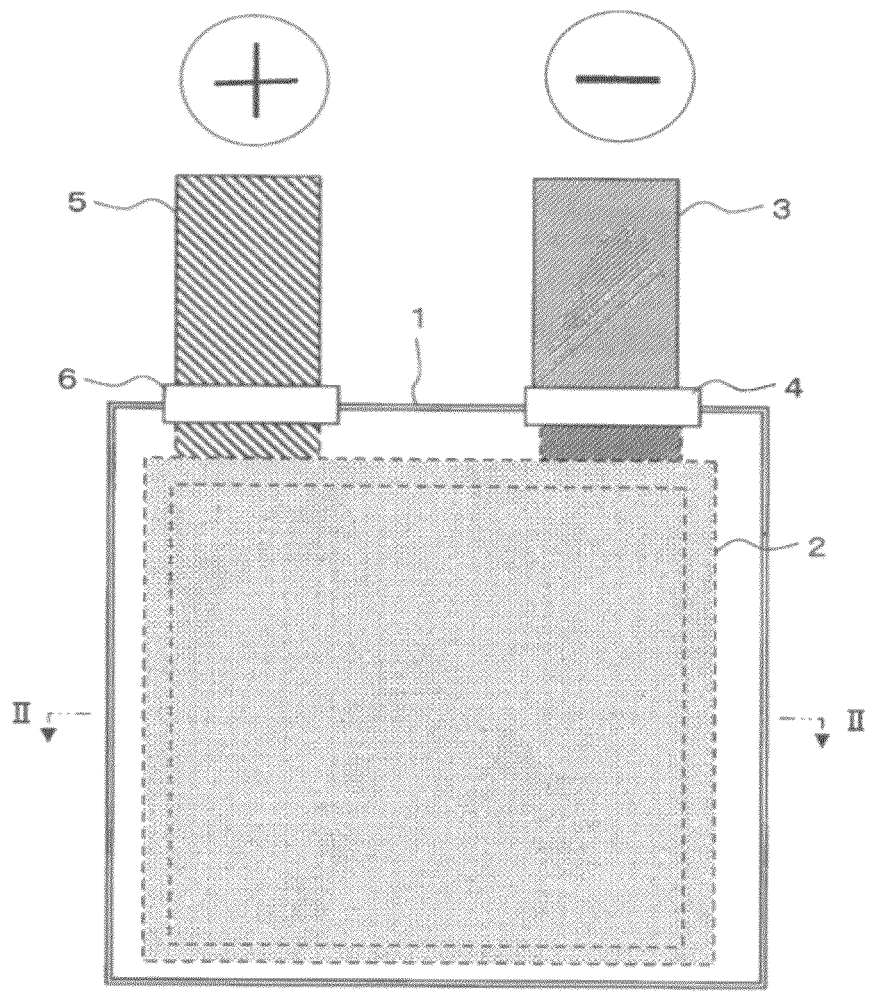
FIG. 1 is a front view illustrating an energy storage device cell according to a first embodiment of the present invention.
Figure 2:
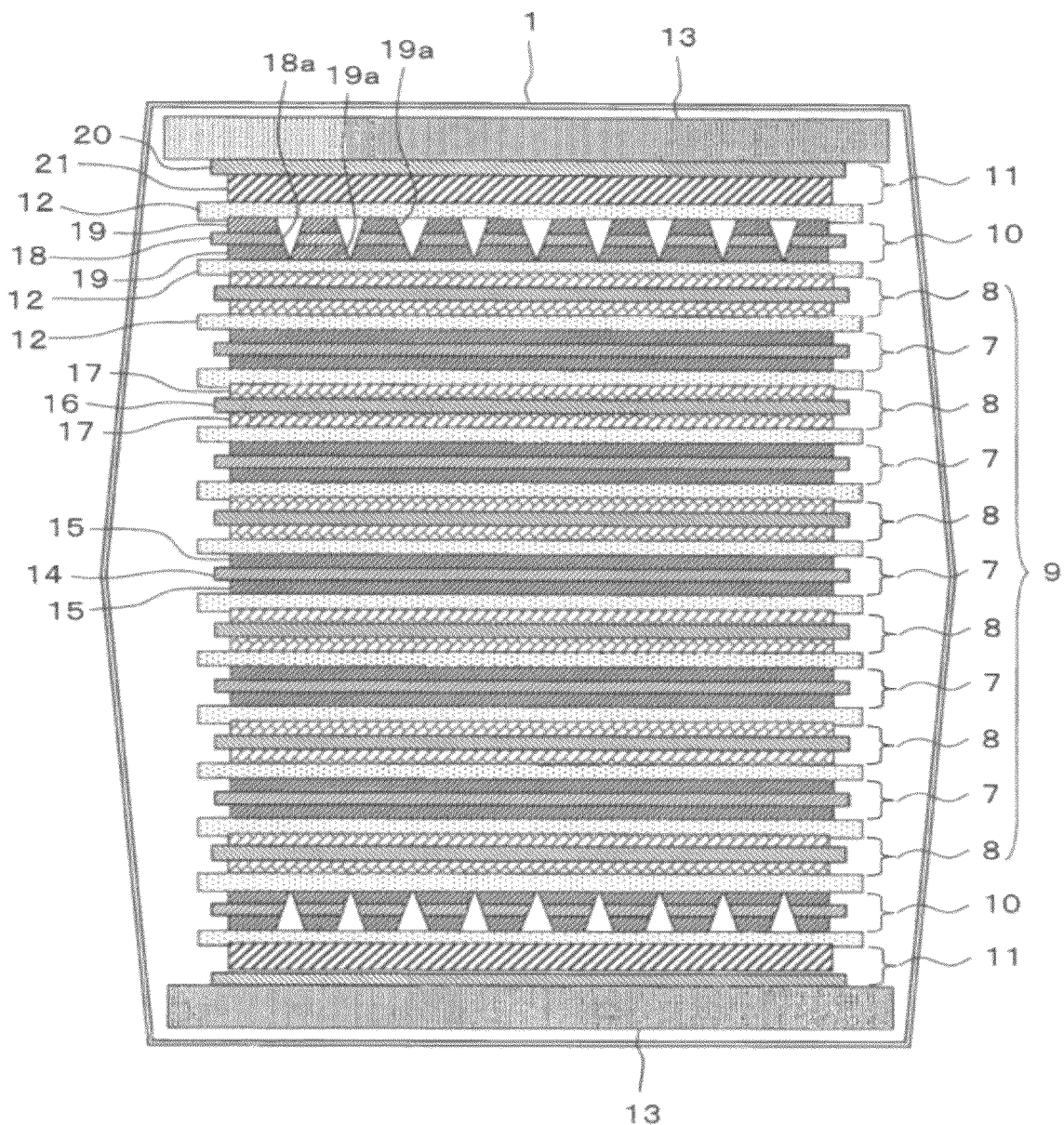
FIG. 2 is a cross-sectional view taken along the line II-II of FIG. 1.

FIG. 1 is a front view illustrating an energy storage device cell according to a first embodiment of the present invention, and FIG. 2 is a cross-sectional view taken along the line II-II of FIG. 1. In FIG. 2, the energy storage device cell of FIG. 1 is illustrated in an enlarged manner in a depth direction. The energy storage device cell according to the first embodiment of the present invention includes a container 1 to be filled with an electrolyte solution, an energy storage device cell body 2 provided in the container 1, an anode terminal 3 connected to the energy storage device cell body 2, an anode seal member 4 for attaching the anode terminal 3 to the container 1, a cathode terminal 5 connected to the energy storage device cell body 2, and a cathode seal member 6 for attaching the cathode terminal 5 to the container 1.

The energy storage device cell body 2 includes a battery main body (lithium ion battery main body) 9 having a plurality of battery anode plate members (lithium ion battery anode portions) 7 and a plurality of battery cathode plate members (lithium ion battery cathode portions) 8, a pair of common anode plate members (common anode portions) 10 stacked on the battery main body 9 so as to sandwich the battery main body 9, a pair of capacitor cathode plate members (lithium ion capacitor cathode portions) 11 stacked on the respective common anode plate members 10, separators 12 provided respectively between the battery anode plate members 7 and the battery cathode plate members 8, between the battery cathode plate members 8 and the common anode plate members 10, and between the common anode plate members 10 and the capacitor cathode plate members 11, and a pair of electrolyte solution reservoirs 13 stacked on the respective capacitor cathode plate members 11.

The battery anode plate members 7 and the battery cathode plate members 8 are each formed in a plate shape. The battery anode plate members 7 and the battery cathode plate members 8 are stacked alternately so that the battery cathode plate members 8 are placed on both ends in the stack direction of the battery main body 9.

The battery anode plate members 7, the battery cathode plate members 8, the separators 12 placed between the battery anode plate members 7 and the battery cathode plate members 8, the common anode plate members 10, and the separators 12 placed between the common anode plate members 10 and the battery cathode plate members 8 together constitute a lithium ion battery (LIB) portion of the energy storage device cell.

The common anode plate members 10, the capacitor cathode plate members 11, and the separators 12 placed between the common anode plate members 10 and the capacitor cathode plate members 11 together constitute lithium ion capacitor (LIC) portions of the energy storage device cell. The pair of lithium ion capacitor portions sandwich the lithium ion battery portion.

The battery anode plate member 7 includes a battery anode collector foil 14, and battery anode electrode layers 15 applied to both surfaces of the battery anode collector foil 14. The battery anode collector foil 14 is formed of a copper foil or an aluminum foil with a thickness of about 10 μm. The battery anode electrode layer 15 contains carbon fine particles to be used in a lithium secondary battery, such as graphite, hard carbon, amorphous carbon, and mesocarbon microbeads graphite. The average particle diameter of the carbon fine particles is about 1 to 20 μm.

The battery cathode plate member 8 includes a battery cathode collector foil 16, and battery cathode electrode layers 17 applied to both surfaces of the battery cathode collector foil 16. The battery cathode collector foil 16 is formed of an aluminum foil with a thickness of about 20 μm. The battery cathode electrode layer 17 contains lithium-containing metal oxide fine particles. As the lithium-containing metal oxide fine particles, for example, olivine-type iron lithium phosphate ($LiFePO_4$), lithium cobalt oxide ($LiCoO_2$), lithium nickel oxide ($LiNiO_2$), or lithium manganese oxide ($LiMn_2O_4$) is used. It is desired that the lithium-containing metal oxide fine particles each have an average particle diameter of about several μm.

The common anode plate members 10 are each formed in a plate shape. The common anode plate members 10 are stacked at both ends in the stack direction of the battery main body 9. The common anode plate member 10 includes a common anode collector foil 18 having a plurality of through-holes 18a formed therein, and common anode electrode layers 19 applied to both surfaces of the common anode collector foil 18 and having a plurality of through-holes 19a formed therein. The through-holes 18a and the through-holes 19a are placed so as to be overlapped with each other. The common anode collector foil 18 is formed of a copper foil or an aluminum foil with a thickness of about 10 μm in the same way as in the battery anode collector foil 14. In the common anode electrode layer 19, carbon fine particles to be used in a lithium secondary battery, such as graphite, hard carbon, amorphous carbon, and mesocarbon microbeads graphite, are used in the same way as in the battery anode electrode layer 15. The average particle diameter of the carbon fine particles is about 1 to 20 μm. The through-holes 18a and the through-holes 19a are formed by, after applying the common anode electrode layers 19 to both surfaces of the common anode collector foil 18, forming through-holes therein using a through-hole forming apparatus having a plurality of needle members such as a frog. As the common anode collector foil 18, a punching metal, an expanded metal, or the like may be used. Further, the through-holes 19a may not be formed in the common anode electrode layer 19.

The opening area of the through-holes 18a is about 1% to 5% with respect to the entire area of the common anode collector foil 18. This enables lithium ions contained in the battery cathode electrode layer 17 in the lithium ion battery portion to move to the lithium ion capacitor portion through the through-holes 18a in an initial period when the energy storage device cell is charged. The ion conduction resistance at which the lithium ions pass through the through-holes 18a can be adjusted by adjusting the opening area of the through-holes 18a, and hence the difference in electrochemical potential between the battery cathode plate member 8 and the capacitor cathode plate member 11 can be regulated.

The capacitor cathode plate members 11 are each formed in a plate shape. The capacitor cathode plate member 11 includes a capacitor cathode collector foil 20, and a capacitor cathode electrode layer 21 applied to one surface of the capacitor cathode collector foil 20. The capacitor cathode plate member 11 is stacked on the common anode plate member 10 so that the capacitor cathode electrode layer 21 is placed between the common anode plate member 10 and the capacitor cathode collector foil 20. The capacitor cathode collector foil 20 is formed of an aluminum foil with a thickness of about 20 μm. The capacitor cathode electrode layer 21 contains activated carbon fine particles. Used as the activated carbon fine particles are fine particles each using, as a raw material, a phenolic resin, petroleum pitch, petroleum coke, palm shell, or the like, having been activated by steam or an alkali, and having an average particle diameter of about 1 to 20 μm.

The number of the battery cathode plate members 8 is larger than that of the capacitor cathode plate members 11. Therefore, the total area of the battery cathode electrode layers 17 is larger than that of the capacitor cathode electrode layers 21.

The electrolyte solution is shared by the lithium ion battery portion and the lithium ion capacitor portions. As the electrolyte solution, an organic electrolyte solution containing lithium ions such as $LiPF_6$ or $LiBF_4$ is used. As an organic solvent for the organic electrolyte solution, for example, one kind or a mixed solvent of two or more kinds selected from propylene carbonate, ethylene carbonate, dimethyl carbonate, diethyl carbonate, dimethoxymethane, diethoxyethane, γ-butyrolactone, acetonitrile, and propionitrile is used.

The electrolyte solution reservoirs 13 are each placed between the inner wall of the container 1 and the capacitor cathode plate member 11. The electrolyte solution reservoir 13 is stacked on the capacitor cathode collector foil 20. The electrolyte solution reservoir 13 relaxes the expansion and contraction of the electrolyte solution involved in charging/discharging of the energy storage device cell.

The anode terminal 3, the battery anode collector foils 14, and the common anode collector foils 18 are bonded to each other via ultrasonic welding or the like. The anode terminal 3, the battery anode collector foils 14, and the common anode collector foils 18 are connected to each other electrically.

The cathode terminal 5, the battery cathode collector foils 16, and the capacitor cathode collector foils 20 are bonded to each other via ultrasonic welding or the like. The cathode terminal 5, the battery cathode collector foils 16, and the capacitor cathode collector foils 20 are connected to each other electrically.

As a material for each of the separators 12 and the electrolyte solution reservoir 13, there may be used olefin-based porous paper of polyethylene, polypropylene, or the like, a cellulose-based material such as natural pulp, natural cellulose, solvent spun cellulose, or bacterial cellulose, nonwoven fabric containing glass fiber or non-fibrillated organic fiber, or a fibrillated film or porous film of nylon 66, aromatic polyamide, wholly aromatic polyamide, aromatic polyester, wholly aromatic polyester, wholly aromatic polyesteramide, wholly aromatic polyether, a wholly aromatic polyazo compound, polyphenylene sulfide (PPS), poly-p-phenylenebenzobisthiazole (PBZT), poly-p-phenylenebenzobisoxazole (PBO), polybenzimidazole (PBI), polyether ether ketone (PEEK), polyamide imide (PAI), polyimide, polytetrafluoroethylene (PTFE), or the like.

As the separators 12, those which have a thickness of about 10 μm to 50 μm, a porosity (void ratio) of about 60% to 80%, and an average pore diameter of several μm to several tens of μm are used. The average pore diameter varies, and the average pore diameter of the same material can be changed easily with a basis weight density.

The capacity (accumulated energy) of the lithium ion capacitor portion is about 1% to 5% of the capacity of the lithium ion battery portion. Thus, the effect of prolonging the cycle life of the lithium ion battery portion can be obtained sufficiently.

As described above, in the energy storage device cell according to the first embodiment of the present invention, the area of the battery cathode electrode layers 17 can be set to be larger than that of the capacitor cathode electrode layers 21. Therefore, a region occupied by the lithium ion battery portion in the entire energy storage device cell can be enlarged. As a result, the energy density of the energy storage device cell can be enhanced.

Further, it is not necessary to form through-holes in the battery anode plate members 7, and the through-holes 18a need to be formed only in the common anode collector foils 18 of the common anode plate members 10. Therefore, even if the number of battery anode plate members 7 is increased, the burden of an operation of forming the through-holes 18a is not increased. This can suppress the degradation in production efficiency of the energy storage device cell.

Further, the energy storage device cell has a configuration in which the plurality of battery anode plate members 7 and the plurality of battery cathode plate members 8 are stacked alternately, and hence the number of the battery anode plate members 7 and the number of the battery cathode plate members 8 can be increased without changing the dimensions of the energy storage device cell in the lateral and vertical directions.

Further, the capacitor cathode plate members 11 are each placed on the outermost side in the stack direction of the battery main body 9, the common anode plate members 10, and the capacitor cathode plate members 11. Therefore, for example, in the case where the container 1 is deformed or a nail or the like sticks into the container 1 from outside, the lithium ion capacitor portion is first short-circuited to be discharged. This can prevent the generation of oxygen from a metal oxide (in the case of a metal oxide of cobalt, manganese, or nickel) caused by the short-circuit of the lithium ion battery portion and prevent the ignition of the energy storage device cell.

Further, the capacitor cathode plate members 11 are each placed on the outermost side in the stack direction of the battery main body 9, the common anode plate members 10, and the capacitor cathode plate members 11. Therefore, the heat dissipation from the capacitor cathode plate members 11, which generate heat most during rapid charging, becomes easy, to thereby prevent an increase in temperature of the lithium ion battery portion in the energy storage device cell and suppress the degradation in the lithium ion battery portion caused by the increase in temperature.

Further, lithium ions contained in the battery cathode plate member 8 adjacent to the capacitor cathode plate member 11 move to the lithium ion capacitor portion through the common anode plate member 10. Therefore, the amount of the lithium ions contained in parts of the lithium ion battery portion adjacent to the common anode plate members 10 becomes smaller than that of the lithium ions contained in the other part of the lithium ion battery portion. Thus, the potential of the common anode plate member 10 becomes higher than that of the battery anode plate member 7, and the precipitation of lithium metal in the battery anode plate member 7 can be suppressed. That is, the safety of the parts of the lithium ion battery portion adjacent to the lithium ion capacitor portions is further enhanced compared with that of the other part of the lithium ion battery portion, and a safer layer can occupy the outer circumferential part of the energy storage device cell.

Second Embodiment

Figure 3:
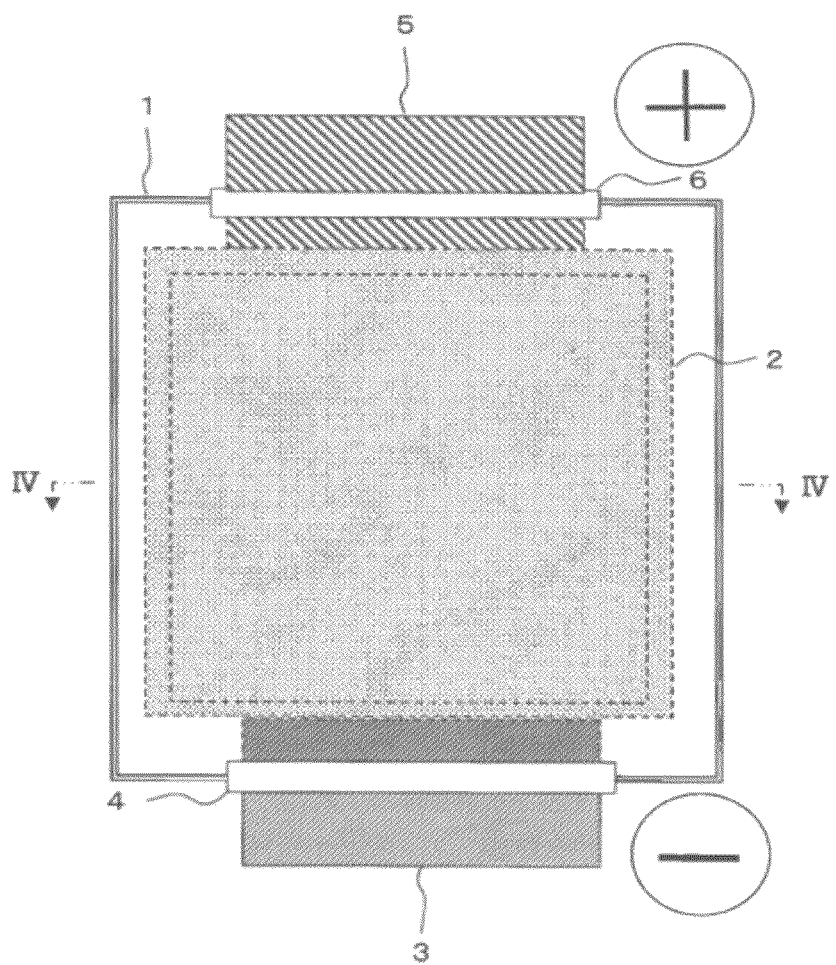
FIG. 3 is a front view illustrating an energy storage device cell according to a second embodiment of the present invention.
Figure 4:
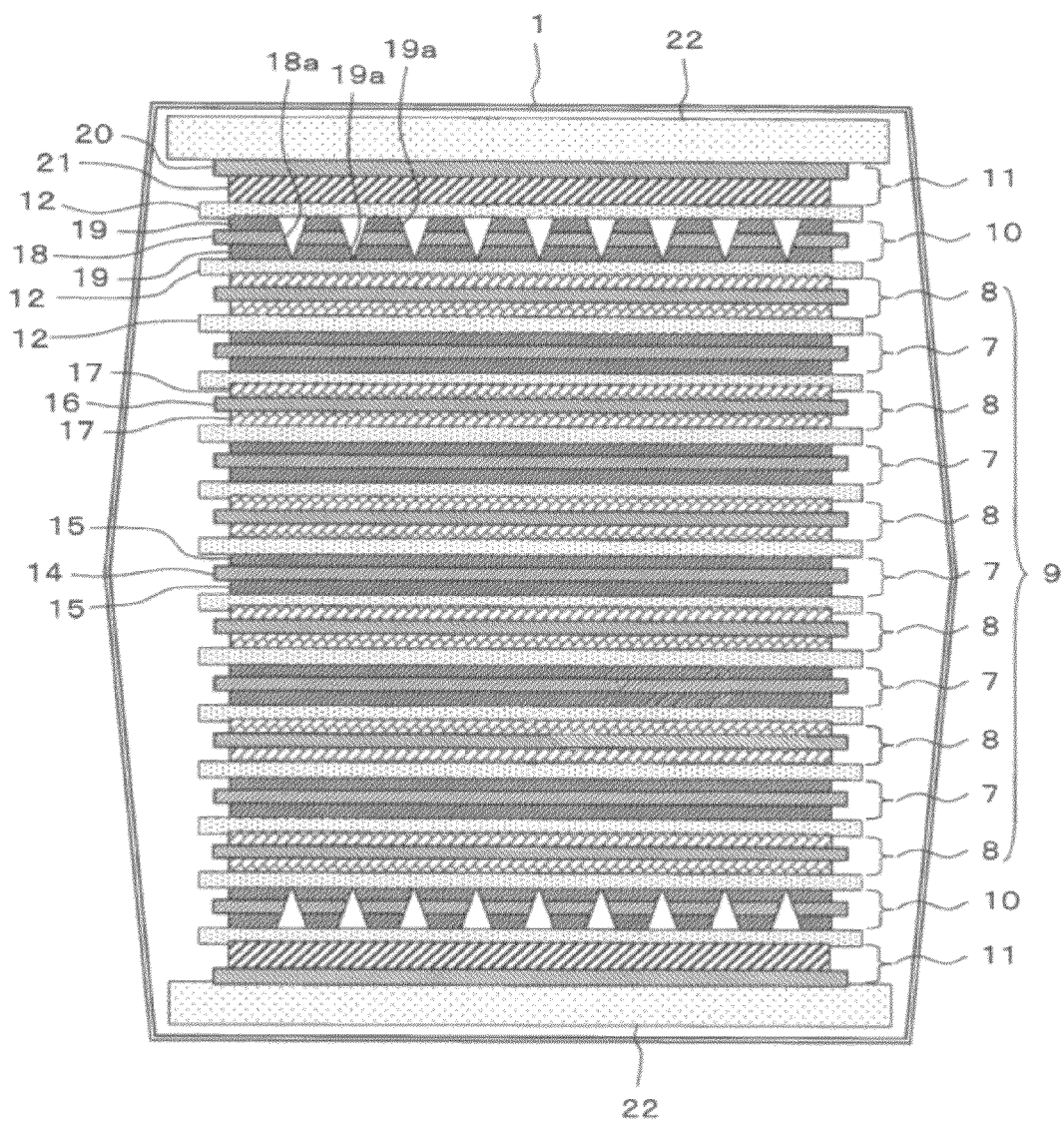
FIG. 4 is a cross-sectional view taken along the line IV-IV of FIG. 3.

FIG. 3 is a front view illustrating an energy storage device cell according to a second embodiment of the present invention, and FIG. 4 is a cross-sectional view taken along the line IV-IV of FIG. 3. In FIG. 4, the energy storage device cell of FIG. 3 is illustrated in an enlarged manner in a depth direction. In the energy storage device cell according to the second embodiment of the present invention, an anode terminal 3 and a cathode terminal 5 are placed so as to extend in opposite directions from an energy storage device cell body 2. The energy storage device cell body 2 includes electrical insulating sheets 22 instead of the electrolyte solution reservoirs 13 described in the first embodiment. The electrical insulating sheets 22 are stacked on capacitor cathode plate members 11. Each electrical insulating sheet 22 is placed between an inner wall of a container 1 and a capacitor cathode collector foil 20.

As the electrical insulating sheet 22, a film with a thickness of about 0.1 mm made of polypropylene, polyethylene, or polyethylene terephthalate is used. The electrical insulating sheet 22 is placed between the container 1 and the capacitor cathode plate member 11, and hence there is an effect of reducing the risk that electrical short-circuit occurs due to the deformation of the container 1 when an impact is applied to the container 1 from outside. The electrical insulating sheet 22 may be provided between the electrolyte solution reservoir 13 described in the first embodiment and the inner wall of the container 1. The other configuration is the same as that of the first embodiment.

As described above, in the energy storage device cell according to the second embodiment of the present invention, the anode terminal 3 and the cathode terminal 5 are placed so as to extend from the energy storage device cell body 2 in opposite directions. Therefore, the dimension in the width direction of each of the anode terminal 3 and the cathode terminal 5 can be increased. This can enlarge each cross-sectional area of the anode terminal 3 and the cathode terminal 5. As a result, the electrical resistance in the anode terminal 3 and the cathode terminal 5 can be reduced.

Further, the electrical insulating sheet 22 is placed between the container 1 and the capacitor cathode plate member 11, which reduces the risk that electrical short-circuit occurs due to the deformation of the container 1 when an impact is applied to the container 1 from outside.

Third Embodiment

Figure 5:
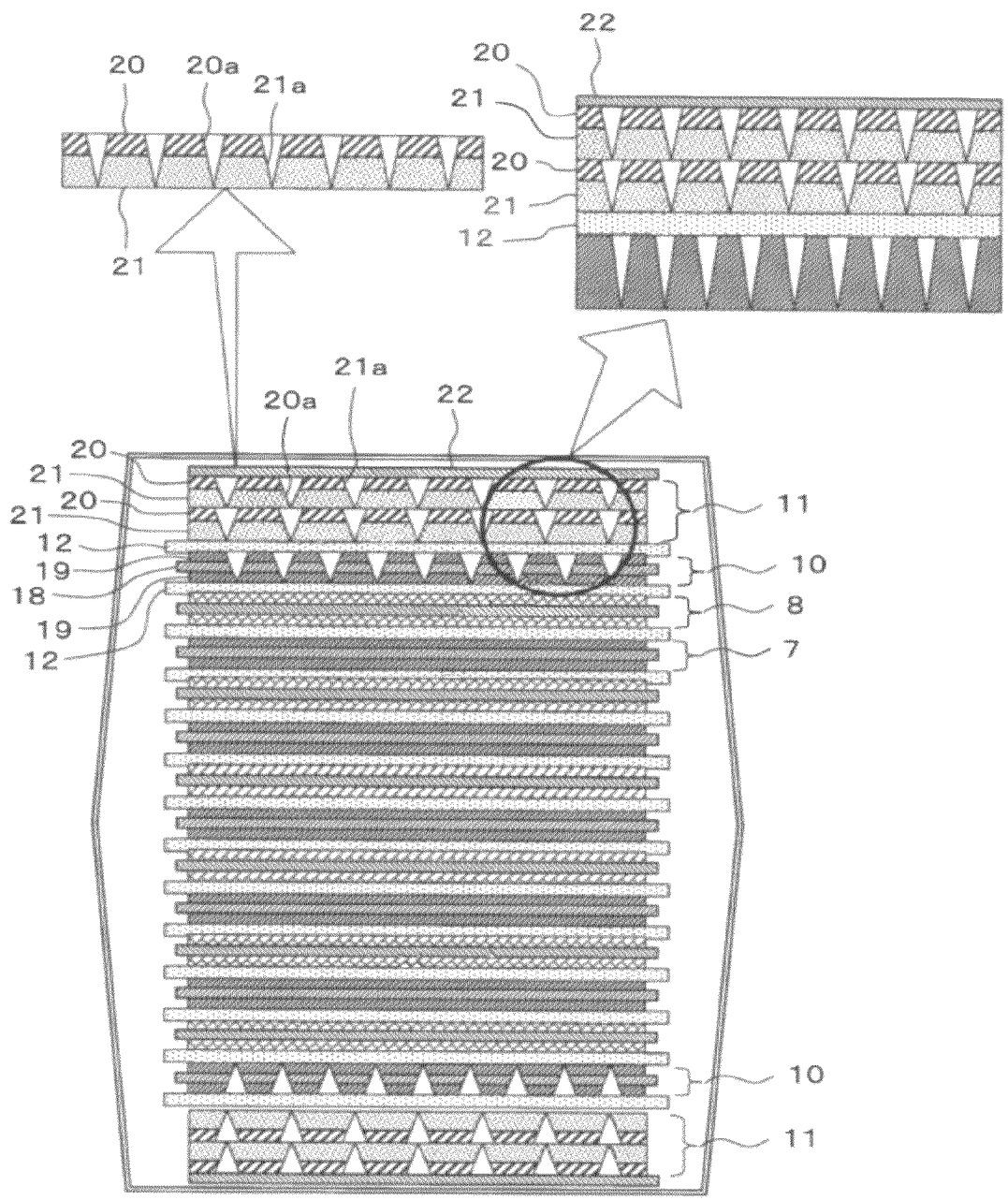
FIG. 5 is a cross-sectional view illustrating an energy storage device cell according to a third embodiment of the present invention.

FIG. 5 is a cross-sectional view illustrating an energy storage device cell according to a third embodiment of the present invention. In the energy storage device cell according to the third embodiment of the present invention, each capacitor cathode plate member 11 has two capacitor cathode collector foils 20 and two capacitor cathode electrode layers 21. The capacitor cathode collector foils 20 and the capacitor cathode electrode layers 21 are stacked alternately. Through-holes 20a are formed in each capacitor cathode collector foil 20. Through-holes 21a are formed in each capacitor cathode electrode layer 21. The through-holes 20a and the through-holes 21a are overlapped with each other. The other configuration is the same as that of the second embodiment. The other configuration may be set to be the same as that of the first embodiment.

As described above, in the energy storage device cell according to the third embodiment of the present invention, the capacitor cathode plate member 11 has two capacitor cathode collector foils 20 and two capacitor cathode electrode layers 21, and the capacitor cathode collector foils 20 and the capacitor cathode electrode layers 21 are stacked alternately. Therefore, the instantaneous power of charging/discharging can be enhanced, and further, the capacity as the lithium ion capacitor can be increased about twice without increasing the thickness of the capacitor cathode electrode layer 21. Thus, the effect of prolonging the life of the lithium ion battery can be enhanced.

In the third embodiment, the capacitor cathode plate member 11 in which two capacitor cathode collector foils 20 and two capacitor cathode electrode layers 21 are stacked alternately is described. However, at least three capacitor cathode collector foils and at least three capacitor cathode electrode layers may be stacked alternately. This can further enhance the capacity and instantaneous power of the lithium ion capacitor and can further enhance the effect of prolonging the life of the lithium ion battery.

Further, in the third embodiment, the configuration is described in which each of the pair of capacitor cathode plate members 11 provided at both ends in the stack direction of the battery main body 9 has two capacitor cathode collector foils 20 and two capacitor cathode electrode layers 21. However, the numbers of the capacitor cathode collector foils 20 and the capacitor cathode electrode layers 21 of the capacitor cathode plate member 11 provided at one end in the stack direction of the battery main body 9 may be different from those of the capacitor cathode collector foils 20 and the capacitor cathode electrode layers 21 of the capacitor cathode plate member 11 provided at the other end in the stack direction of the battery main body 9.

Further, in the third embodiment, the configuration is described in which the through-holes 20a are formed in each of the stacked capacitor cathode collector foils 20. However, the through-holes 20a may be formed only in the capacitor cathode collector foil 20 placed on the common anode plate member 10 side with respect to the capacitor cathode electrode layer 21 which is positioned farthest from the common anode plate member 10.

Further, in the third embodiment, the configuration is described in which the through-holes 21a are formed in the capacitor cathode electrode layers 21. However, the through-holes 21a may not be formed in the capacitor cathode electrode layers 21.

Fourth Embodiment

Figure 6:
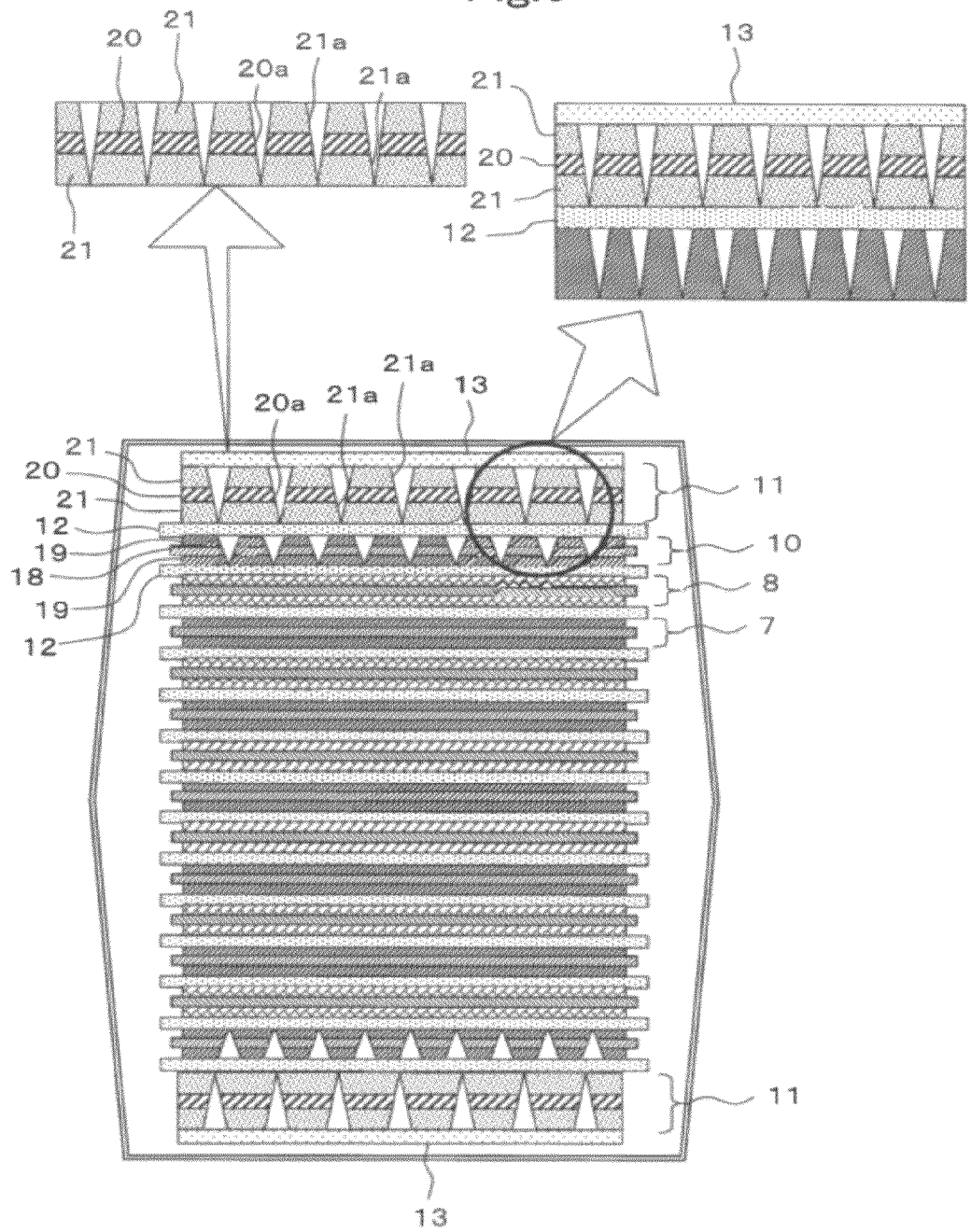
FIG. 6 is a cross-sectional view illustrating an energy storage device cell according to a fourth embodiment of the present invention.

FIG. 6 is a cross-sectional view illustrating an energy storage device cell according to a fourth embodiment of the present invention. In the energy storage device cell according to the fourth embodiment of the present invention, capacitor cathode electrode layers 21 are applied to both surfaces of a capacitor cathode collector foil 20. Through-holes 20a are formed in the capacitor cathode collector foil 20. Through-holes 21a are formed in the capacitor cathode electrode layers 21. The through-holes 20a and the through-holes 21a are overlapped with each other. The other configuration is the same as that of the first embodiment. The other configuration may be set to be the same as that of the second embodiment.

As described above, in the energy storage device cell according to the fourth embodiment of the present invention, the capacitor cathode electrode layers 21 are applied to both surfaces of the capacitor cathode collector foil 20, and the through-holes 20a are formed in the capacitor cathode collector foil 20. Therefore, charging/discharging can be performed on both surfaces of the capacitor cathode collector foil 20. As a result, the capacity of the lithium ion capacitor can be increased about twice.

In the fourth embodiment, the configuration of the capacitor cathode plate member 11 is described, which has one capacitor cathode collector foil 20 and the capacitor cathode electrode layers 21 applied to both surfaces of the capacitor cathode collector foil 20. However, the capacitor cathode plate member 11 may have a plurality of stacked capacitor cathode collector foils 20 and the capacitor cathode electrode layers 21 applied to both surfaces of the respective capacitor cathode collector foils 20. In this case, separators 12 may be placed between adjacent capacitor cathode electrode layers 21.

Fifth Embodiment

FIG. 7 is a front view illustrating an energy storage device cell according to a fifth embodiment of the present invention, and FIG. 8 is a cross-sectional view taken along the line VIII-VIII of FIG. 7. In the energy storage device cell according to the fifth embodiment of the present invention, an anode terminal 3 and a cathode terminal 5 are placed so as to extend from an energy storage device cell body 2 in opposite directions.

The energy storage device cell body 2 includes a battery main body (lithium ion battery main body) 25 having one battery anode band member (lithium ion battery anode band member) 23 and one battery cathode band member (lithium ion battery cathode band member) 24, in which the battery anode band member 23 and the battery cathode band member 24 are wound while being stacked on each other, a common anode band member 26 covering the periphery of the battery main body 25, a capacitor cathode band member (lithium ion capacitor cathode band member) 27 covering the periphery of the common anode band member 26, separators (not shown) provided respectively between the battery anode band member 23 and the battery cathode band member 24, between the battery cathode band member 24 and the common anode band member 26, and between the common anode band member 26 and the capacitor cathode band member 27, and an electrolyte solution reservoir 13 stacked on the capacitor cathode band member 27. The electrical insulating sheet 22 may be provided as described in the second embodiment, instead of the electrolyte solution reservoir 13. Further, the electrical insulating sheet 22 may be provided between the inner wall of the container 1 and the electrolyte solution reservoir 13.

As in the battery anode plate member 7 described in the first embodiment, the battery anode band member 23 includes a plurality of battery anode portions (lithium ion battery anode portions) each having a battery anode collector foil and battery anode electrode layers applied to both surfaces of the battery anode collector foil. The plurality of battery anode portions are coupled in line to constitute the band-shaped battery anode band member 23.

As in the battery cathode plate member 8 described in the first embodiment, the battery cathode band member 24 includes a plurality of battery cathode portions (lithium ion battery cathode portions) each having a battery cathode collector foil and battery cathode electrode layers applied to both surfaces of the battery cathode collector foil. The plurality of battery cathode portions are coupled in line to constitute the band-shaped battery cathode band member 24.

As in the common anode plate member 10 described in the first embodiment, the common anode band member 26 includes a plurality of common anode portions each having a common anode collector foil in which a plurality of through-holes are formed and common anode electrode layers which are applied to both surfaces of the common anode collector foil and in which a plurality of through-holes are formed. The plurality of common anode portions are coupled in line to constitute the band-shaped common anode band member 26.

As in the capacitor cathode plate member 11 described in the first embodiment, the capacitor cathode band member 27 includes a plurality of capacitor cathode portions (lithium ion capacitor cathode portions) each having a capacitor cathode collector foil and a capacitor cathode electrode layer applied to one surface of the capacitor cathode collector foil. The plurality of capacitor cathode portions are coupled in line to constitute the band-shaped capacitor cathode band member 27.

The battery anode band member 23 and the battery cathode band member 24 are wound in such a manner that a portion of the battery cathode band member 24 is placed in an outer circumferential portion of the battery main body 25. The common anode band member 26 is connected to an outer circumferential end of the battery anode band member 23. The common anode band member 26 is stacked on an outer circumferential surface of the portion of the battery cathode band member 24 placed in the outer circumferential portion of the battery main body 25. The capacitor cathode band member 27 is stacked on an outer circumferential surface of the common anode band member 26. The other configuration is the same as that of the second embodiment.

As described above, in the energy storage device cell according to the fifth embodiment of the present invention, a plurality of battery anode portions constitute the band-shaped battery anode band member 23, a plurality of battery cathode portions constitute the band-shaped battery cathode band member 24, and the battery anode band member 23 and the battery cathode band member 24 are wound while being stacked on each other. Therefore, merely by increasing the number of turns of the battery anode band member 23 and the battery cathode band member 24, the region occupied by the battery main body 25 in the entire energy storage device cell can be increased easily. As a result, the energy density of the energy storage device cell can be enhanced easily.

Sixth Embodiment

Figure 9:
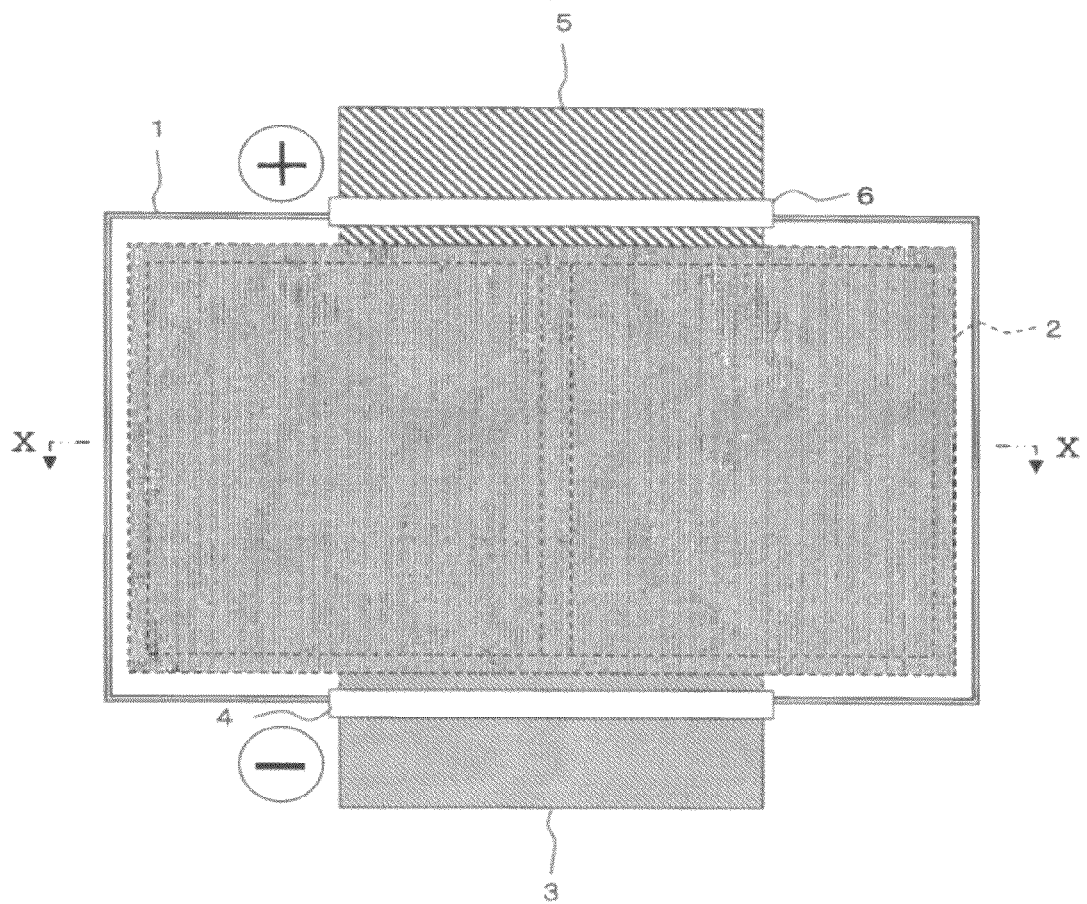
FIG. 9 is a front view illustrating an energy storage device cell according to a sixth embodiment of the present invention.
Figure 10:
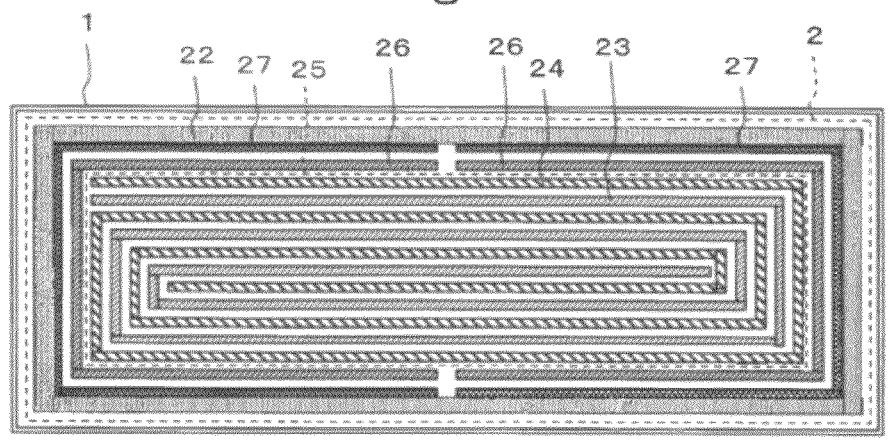
FIG. 10 is a cross-sectional view taken along the line X-X of FIG. 9.

FIG. 9 is a front view illustrating an energy storage device cell according to a sixth embodiment of the present invention, and FIG. 10 is a cross-sectional view taken along the line X-X of FIG. 9. In the energy storage device cell according to the sixth embodiment of the present invention, common anode band members 26 are separated from a battery anode band member 23. Two common anode band members 26 are stacked on a battery cathode band member 24 so as to cover a battery main body 25. Two capacitor cathode band members 27 are stacked on the common anode band members 26 so as to cover the battery main body 25 and the common anode band members 26. An electrical insulating sheet 22 is stacked on an outer circumferential surface of each of the capacitor cathode band members 27. The other configuration is the same as that of the fifth embodiment. The electrolyte solution reservoir 13 may be provided as described in the fifth embodiment, instead of the electrical insulating sheet 22. Further, the electrical insulating sheet 22 may be provided between the inner wall of the container 1 and the electrolyte solution reservoir 13 described in the fifth embodiment.

As described above, in the energy storage device cell according to the sixth embodiment of the present invention, the common anode band members 26 are separated from the outer circumferential end of the battery anode band member 23, and hence the common anode band members 26 can easily cover the entire battery main body 25. Further, the two common anode band members 26 cover the battery main body 25, and hence the energy storage device cell can be produced easily.

Seventh Embodiment

Figure 11:
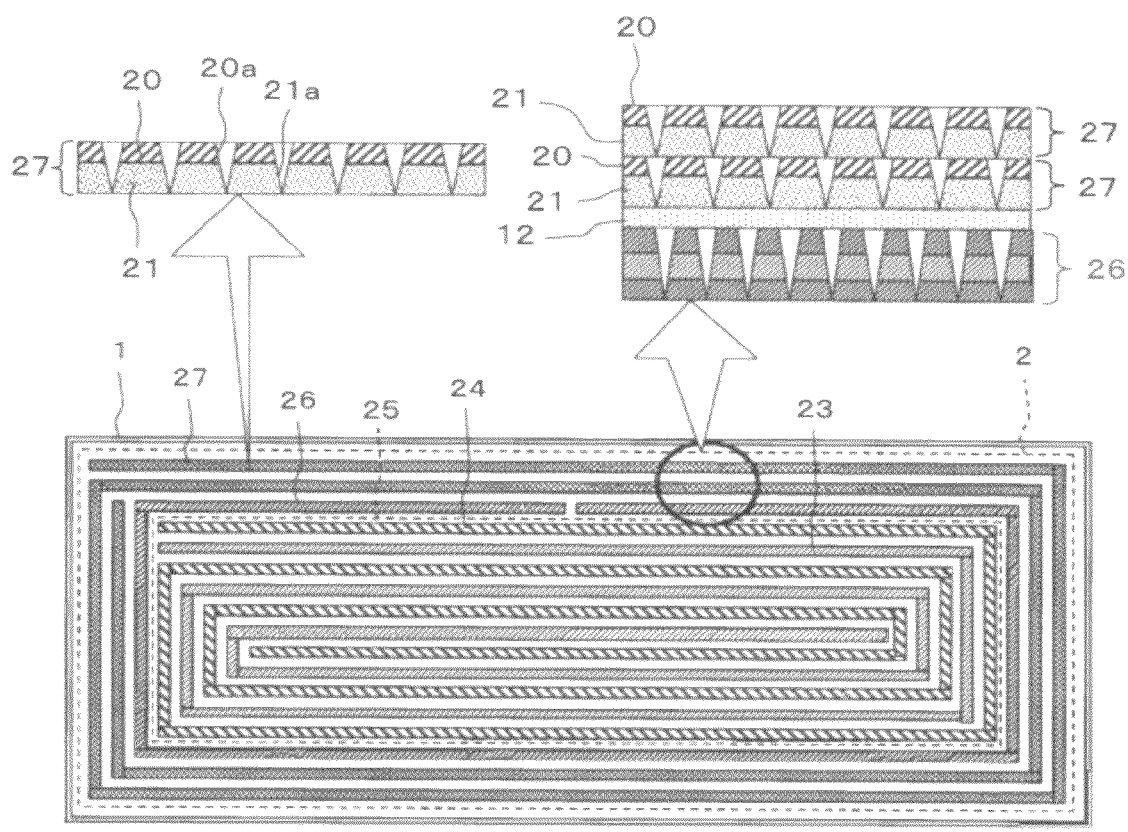
FIG. 11 is a cross-sectional view illustrating an energy storage device cell according to a seventh embodiment of the present invention.

FIG. 11 is a cross-sectional view illustrating an energy storage device cell according to a seventh embodiment of the present invention. In the energy storage device cell according to the seventh embodiment of the present invention, one common anode band member 26 is stacked on a battery cathode band member 24 so as to cover a battery main body 25. A capacitor cathode band member 27 is wound twice around the outer circumferential surface of the common anode band member 26 to be stacked on the common anode band member 26. A plurality of through-holes 20a are formed in a capacitor cathode collector foil 20 of the capacitor cathode band member 27. Through-holes 21a are formed in a capacitor cathode electrode layer 21 of the capacitor cathode band member 27. The through-holes 20a and the through-holes 21a are overlapped with each other. The other configuration is the same as that of the sixth embodiment.

As described above, in the energy storage device cell according to the seventh embodiment of the present invention, the capacitor cathode band member 27 is wound twice around the outer circumferential surface of the common anode band member 26, and hence the instantaneous power of charging/discharging can be enhanced. Further, the capacity as the lithium ion capacitor can be increased about twice without increasing the thickness of the capacitor cathode electrode layer 21. Thus, the effect of prolonging the life of the lithium ion battery can be enhanced.

Eighth Embodiment

Figure 12:
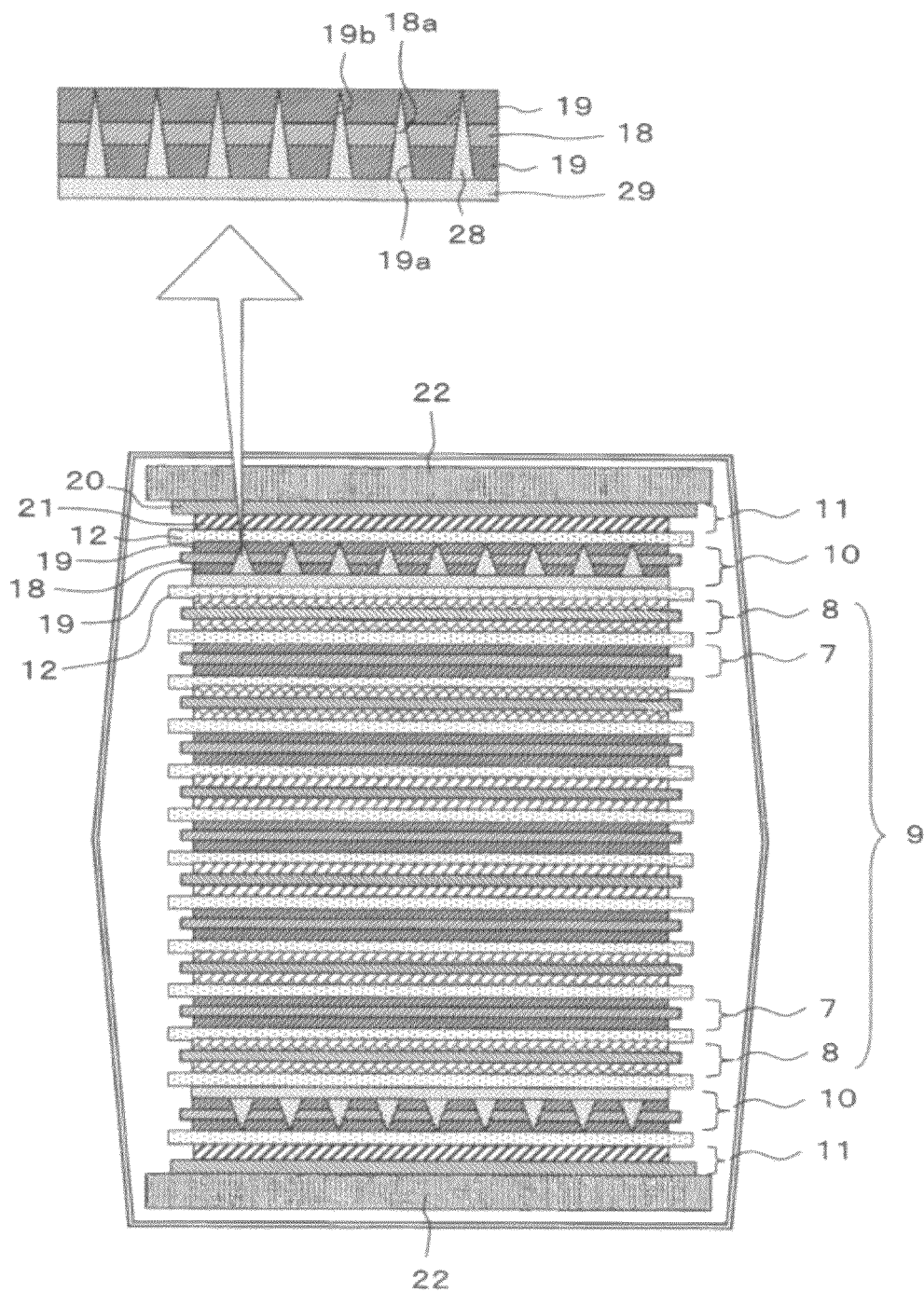
FIG. 12 is a cross-sectional view illustrating an energy storage device cell according to an eighth embodiment of the present invention.

FIG. 12 is a cross-sectional view illustrating an energy storage device cell according to an eighth embodiment of the present invention. In the energy storage device cell according to the eighth embodiment of the present invention, through-holes 19a are formed in a common anode electrode layer 19 which is provided on a battery main body 9 side of a pair of common anode electrode layers 19 provided on both surfaces of a common anode collector foil 18 so that the through-holes 19a are overlapped with through-holes 18a formed in the common anode collector foil 18. Further, in the energy storage device cell, concave portions 19b opposed to the through-holes 18a of the common anode collector foil 18 are formed in a surface of the common anode electrode layer 19 on the common anode collector foil 18 side, the common anode electrode layer 19 being provided on the capacitor cathode plate member 11 side of the pair of common anode electrode layers 19 provided on both surfaces of the common anode collector foil 18. That is, in the common anode plate member 10, concave portions that are dented toward the capacitor cathode plate member 11 side are formed in a portion on the battery main body 9 side. The opening area of the through-holes 18a is the same as that of the through-holes 19a.

Further, the common anode plate member 10 further includes electron insulating metal oxide fine particles 28 filling each of the through-holes 18a, the through-holes 19a, and the concave portions 19b, and an electron insulating metal oxide fine particle layer 29 stacked on the common anode electrode layer 19 which is provided on the battery main body 9 side of the pair of common anode electrode layers 19 provided on both surfaces of the common anode collector foil 18. The electron insulating metal oxide fine particle layer 29 is placed between a separator 12 positioned between the battery main body 9 and the common anode plate member 10, and the common anode electrode layer 19 which is provided on the battery main body 9 side of the pair of common anode electrode layers 19 provided on both surfaces of the common anode collector foil 18.

Figure 13:
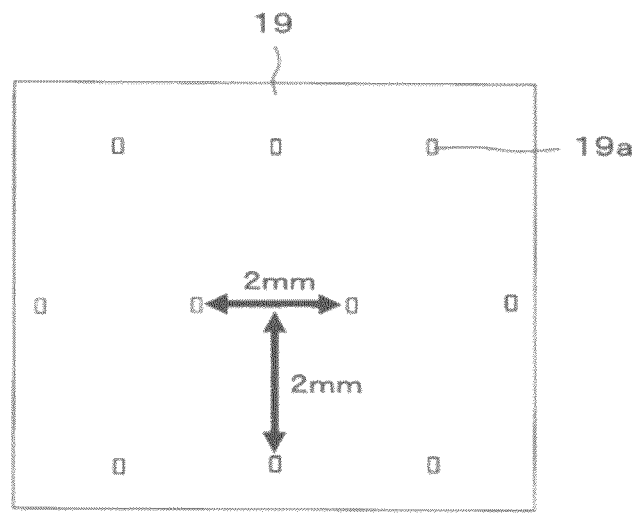
FIG. 13 is a plan view of a common anode plate member of FIG. 12 as viewed from the battery main body side.
Figure 14:
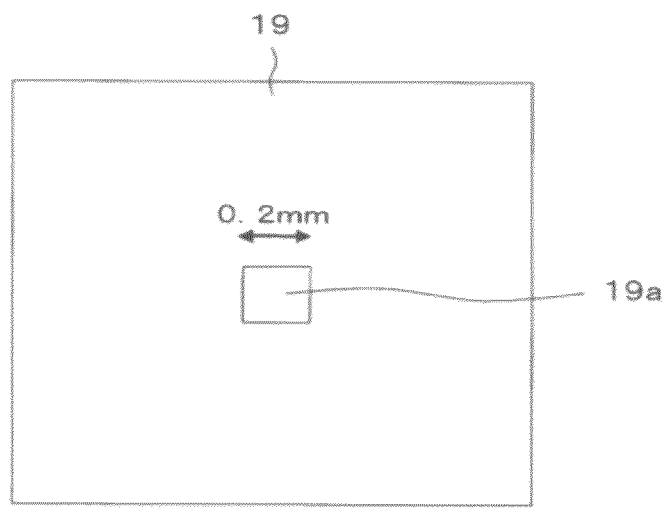
FIG. 14 is an enlarged view illustrating a main portion of FIG. 13.

FIG. 13 is a plan view of the common anode plate member 10 of FIG. 12 as viewed from the battery main body 9 side. FIG. 14 is an enlarged view illustrating a main portion of FIG. 13. FIG. 15 is a perspective view and a photograph showing a cutting tooth roll for forming the through-holes 18a of the common anode collector foil 18 and the through-holes 19a and the concave portions 19b of the common anode electrode layer 19 of FIG. 12. FIG. 16 is a perspective view illustrating the common anode collector foil 18 in which the through-hole 18a is formed by the cutting tooth roll of FIG. 15. In order to form the through-holes 18a, the through-holes 19a, and the concave portions 19b in the common anode plate member 10, the common anode plate member 10 is sandwiched between the cutting tooth roll having a plurality of cutters on its periphery and a plate rubber roll provided so as to be adjacent to the cutting tooth roll, and the common anode plate member 10 is perforated. After that, hot-roll pressing is performed to close portions on the capacitor cathode plate member 11 side of the through-holes 19a of the common anode electrode layer 19 so that the concave portions 19b are formed in the common anode electrode layer 19 on the capacitor cathode plate member 11 side.

It is desired that the tip end of a cutter disc of the cutting tooth roll have a square-pyramid shape. Thus, when the through-holes 18a are formed in the common anode collector foil 18, a crossed cut is formed in the common anode collector foil 18, and four bent portions are formed. Each bent portion has a triangular shape or a trapezoidal shape and remains so as to be connected to the inner wall of the through-hole 18a in a square shape in plan view. As a result, compared with the case where metal chips come off from the common anode collector foil 18 to dissipate, the cause of electrical short-circuit can be reduced. The shape of the tip end of the cutter disc is not limited to a square pyramid, as long as the common anode collector foil 18 can be perforated without the fear that metal chips come off to dissipate. Even when the tip end of the cutter disc has a triangular pyramid, a five-sided pyramid, a six-sided pyramid, an eight-sided pyramid, or the like, the similar effects are obtained.

The cutting tooth roll is formed by alternately stacking a smooth disc made of aluminum having a thickness of 1.6 mm and a cutter disc made of stainless steel having a thickness of 0.4 mm around which 90 cutters are formed at equal intervals, and inserting the stacked discs in a core rod. The applicant of this application has actually developed a cutting tooth roll capable of perforating to a width of 130 mm by setting the numbers of the smooth discs and the cutter discs to 65, respectively. The number of cutters of the cutting tooth roll was 5,850. By changing the thickness of the smooth disc, a perforation pitch that is an interval of the through-holes 18a adjacent to each other in the width direction can be changed. Because it is easy to replace the cutter disc, the common anode plate members 10 having different opening diameters and area opening ratios can be produced easily by replacing the cutter disc by those which have cutters in different shapes.

The cutter disc is formed by stacking a plurality of cutter discs by wire discharge processing technology. Thus, a plurality of precise teeth in a square-pyramid shape can be formed in a cutter disc made of stainless steel at low cost in a short period of time.

According to a method of perforating the common anode plate member 10, the common anode plate member 10 is sandwiched between a cutting tooth roll and a smooth rubber roll which are placed between an unwinding roll and a rewinding roll so as to be perforated, while the common anode plate member 10 wound around the unwinding roll is wound up by the rewinding roll. Thus, the common anode plate members 10 can be mass-produced.

By adjusting the height of a square-pyramid portion that is the tip end of the cutter disc, the size of through-holes to be formed in the common anode electrode layer 19 on the capacitor cathode plate member 11 side of the common anode plate member 10 during perforation can be reduced. The through-holes to be formed in the common anode electrode layer 19 on the capacitor cathode plate member 11 side of the common anode plate member 10 during perforation are closed by hot-roll pressing, and thus the concave portions 19b are formed in the common anode electrode layer 19 on the capacitor cathode plate member 11 side of the common anode plate member 10.

In this example, the area opening ratio of the through-holes 19a of the common anode electrode layer 19 was set to 0.1%. The area opening ratio was calculated using an enlarged view illustrating a main portion of the common anode electrode layer 19.

An example of the method of forming the electron insulating metal oxide fine particle layer 29 and the method of filling the through-holes 18a, the through-holes 19a, and the concave portions 19b with the electron insulating metal oxide fine particles 28 includes a method of, after forming the through-holes 18a, the through-holes 19a, and the concave portions 19b in the common anode plate member 10, applying a paste containing the electron insulating metal oxide fine particles 28 to the common anode electrode layer 19 with a roll coater or a die coater so that the paste fills the through-holes 18a, the through-holes 19a, and the concave portions 19b, followed by performing hot-roll pressing.

The electron insulating metal oxide fine particles 28 filling the through-holes 18a, the through-holes 19a, and the concave portions 19b, and the electron insulating metal oxide fine particle layer 29 have the effect of facilitating the retention and movement of an electrolyte solution. In particular, alumina has high compatibility with the electrolyte solution, and hence has a high effect of facilitating the retention and movement of the electrolyte solution. Further, by setting the average particle diameter of alumina to be smaller than several μm, which is an average particle diameter of graphite or hard carbon that is an anode active material, the diameter of pores to be formed between particles can be decreased to enhance the effect of facilitating the retention and movement of the electrolyte solution.

The electron insulating metal oxide fine particles 28 filling the through-holes 18a, the through-holes 19a, and the concave portions 19b can obtain the effect of remarkably lowering the possibility that particles of an active material such as graphite or hard carbon of an anode may slide off and float to reach a separator, causing a cathode and the anode to be short-circuited electrically.

The electron insulating metal oxide fine particle layer 29 enhances the electrical resistance caused by electron conduction between the common anode plate member 10 and the battery cathode plate member 8. Therefore, even in the case where inconvenience such as thermal contraction occurs in the separator 12, the effect of preventing electrical short-circuit between electrodes can be obtained.

As the electron insulating metal oxide fine particles 28, alumina particles each having a particle diameter of about 0.1 μm are desired, and it is desired that the particles each contain a binder such as polyvinylidene difluoride (PVDF) or styrene-butadiene rubber (SBR). The use of alumina particles each having a particle diameter of more than 1 μm makes it difficult to fill the through-holes 18a, the through-holes 19a, and the concave portions 19b. Meanwhile, the use of alumina particles each having a particle diameter of less than 0.1 μm makes it difficult to disperse a paste containing the particles and apply the paste to the common anode electrode layer 19.

As the thickness of the electron insulating metal oxide fine particle layer 29, less than about 10 μm is desired. When the thickness of the electron insulating metal oxide fine particle layer 29 exceeds 10 μm, the internal resistance increases, and the power density decreases.

It is desired that the area opening ratio of the concave portions of the common anode plate member 10, that is, the area opening ratio of the through-holes 19a be 0.01% or more and 1% or less. When the area opening ratio is below 0.01%, the rate of lithium doping to the rear surface of the common anode plate member 10 becomes remarkably low. Further, when the area opening ratio exceeds 1%, metal ions on the battery cathode plate member 8 side pass through the through-holes 19a, the through-holes 18a, and the concave portions 19b with the passage of time to reach the capacitor cathode plate member 11, which increases the risk that the metal ions are adsorbed to activated carbon. When the metal ions on the battery cathode plate member 8 side are adsorbed to the activated carbon of the capacitor cathode plate member 11, there is a fear that the performance of the capacitor cathode plate member 11 may be impaired. The other configuration is the same as that of the first embodiment.

As described above, in the energy storage device cell according to the eighth embodiment of the present invention, the common anode electrode layer 19 which is provided on the battery main body 9 side of the common anode electrode layers 19 provided on both surfaces of the common anode collector foil 18 has the through-holes 19a formed therein so that the through-holes 19a are overlapped with the through-holes 18a formed in the common anode collector foil 18, and the surface of the common anode electrode layer 19 on the common anode collector foil 18 side, which is provided on the capacitor cathode plate member 11 side of the common anode electrode layers 19 provided on both surfaces of the common anode collector foil 18 has the concave portions 19b formed therein to be opposed to the through-holes 18a formed in the common anode collector foil 18. Therefore, the rate of doping of lithium ions can be enhanced. Further, in the case where the diameters of the through-holes 18a and 19a are larger than the pore diameter of the separators 12, due to the relationship of a pore attraction force, the electrolyte solution cannot be accumulated in the through-holes 18a and 19a because of a weak pore attraction force, and hence gas occupies the through-holes 18a and 19a. This makes it difficult for the electrolyte solution to move through the through-holes 18a and 19a, and the free movement of the electrolyte solution between the battery cathode plate member 8 side and the capacitor cathode plate member 11 side can be interrupted. In the case where the energy storage device cell is at the end of life and the electrolyte solution contains metal ions of the battery cathode plate member 8, there is a fear that the metal ions are adsorbed to activated carbon of the capacitor cathode plate member 11 to degrade the performance of the capacitor cathode plate member 11. However, if the free movement of the electrolyte solution between the battery cathode plate member 8 and the capacitor cathode plate member 11 is interrupted, such a fear is reduced. At the beginning of life of the energy storage device cell, there is a sufficient amount of electrolyte solution, and the through-holes 18a and 19a are filled with the electrolyte solution. Therefore, lithium ions move from the battery cathode plate member 8 side to the capacitor cathode plate member 11 side. After that, as the electrolyte solution is absorbed by pores of the activated carbon of the capacitor cathode plate member 11, the amount of the electrolyte solution that can move freely decreases, and the electrolyte solution is absorbed preferentially by the pores with a strong pore attraction force. At the end of life, the through-holes 18a and 19a are filled with nothing and occupied by gas. Thus, at the end of life, although the metal ions of the battery cathode plate member 8 are eluted, the amount of the metal ions adsorbing to the activated carbon of the capacitor cathode plate member 11 can be reduced.

Further, the common anode plate member 10 includes the electron insulating metal oxide fine particles 28 filling the through-holes 18a, the through-holes 19a, and the concave portions 19b. Therefore, the retention and movement of the electrolyte solution in the through-holes 18a, the through-holes 19a, and the concave portions 19b can be facilitated.

Further, the area opening ratio of the through-holes 19a of the common anode electrode layer 19 is 0.01% or more and 0.1% or less, and hence the rate of doping of lithium ions can be enhanced, and the metal ions on the battery cathode plate member 8 side can be prevented from passing through the common anode plate member 10 to reach the capacitor cathode plate member 11.

Ninth Embodiment

Figure 17:
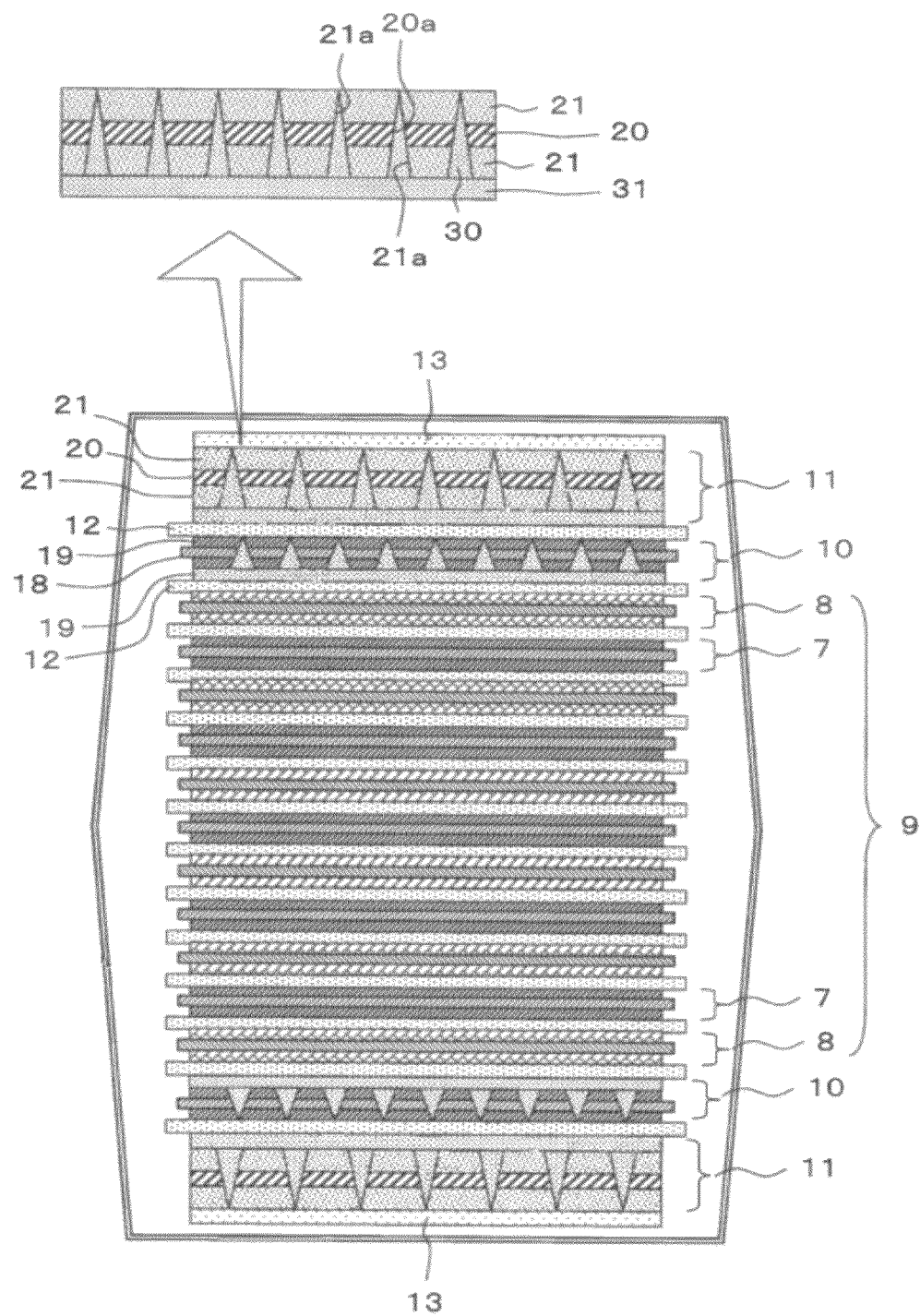
FIG. 17 is a cross-sectional view illustrating an energy storage device cell according to a ninth embodiment of the present invention.

FIG. 17 is a cross-sectional view illustrating an energy storage device cell according to a ninth embodiment of the present invention. In the energy storage device cell according to the ninth embodiment of the present invention, in addition to the energy storage device cell according to the eighth embodiment, the capacitor cathode electrode layers 21 are applied to both surfaces of the capacitor cathode collector foil 20, the capacitor cathode collector foil 20 has the through-holes 20a formed therein, and the capacitor cathode electrode layer 21 has the through-holes 21a formed therein, as in the energy storage device cell according to the fourth embodiment. The through-holes 20a and 21a are overlapped with each other.

The capacitor cathode plate member 11 further includes electron insulating metal oxide fine particles 30 filling the through-holes 20a and 21a, respectively, and an electron insulating metal oxide fine particle layer 31 overlapped with the capacitor cathode electrode layer 21 which is provided on the common anode plate member 10 side of the pair of capacitor cathode electrode layers 21 provided on both surfaces of the capacitor cathode collector foil 20. The electron insulating metal oxide fine particle layer 31 is placed between the separator 12 positioned between the common anode plate member 10 and the capacitor cathode plate member 11, and the capacitor cathode electrode layer 21 which is provided on the common anode plate member 10 side of the pair of capacitor cathode electrode layers 21 provided on both surfaces of the capacitor cathode collector foil 20.

The method of forming the electron insulating metal oxide fine particle layer 31 and the method of filling the through-holes 20a and the through-holes 21a with the electron insulating metal oxide fine particles 30 are the same as the method of forming the electron insulating metal oxide fine particle layer 29 and the method of filling the through-holes 18a, the through-holes 19a, and the concave portions 19b with the electron insulating metal oxide fine particles 28 in the eighth embodiment. An example of the methods includes a method of, after perforating the capacitor cathode plate member 11, applying a paste containing the electron insulating metal oxide fine particles 30 to the capacitor cathode electrode layer 21 with a roll coater or a die coater so that the paste fills the through-holes 20a and the through-holes 21a, followed by performing hot-roll pressing.

The electron insulating metal oxide fine particles 30 filling the through-holes 20a and the through-holes 21a, and the electron insulating metal oxide fine particle layer 31 have the effect of facilitating the retention and movement of an electrolyte solution.

The electron insulating metal oxide fine particles 30 filling the through-holes 20a and the through-holes 21a can obtain the effect of remarkably lowering the possibility that activated carbon particles whose particle diameters are several μm may slide off and float to reach a separator, causing a cathode and an anode to be short-circuited electrically.

The electron insulating metal oxide fine particle layer 31 enhances the electrical resistance caused by electron conduction between the common anode plate member 10 and the capacitor cathode plate member 11. Therefore, even in the case where inconvenience such as thermal contraction occurs in the separator 12, the effect of preventing electrical short-circuit between electrodes can be obtained.

The area occupying ratio of the through-holes 20a and 21a is set to 20%.

In the same way as in the eighth embodiment, as the electron insulating metal oxide fine particles 28, alumina particles each having a particle diameter of about 0.1 µm are desired, and it is desired that the particles each contain a binder such as polyvinylidenedifluoride (PVDF) or styrene-butadiene rubber (SBR). In addition, as the thickness of the electron insulating metal oxide fine particle layer 31, less than about 10 µm is desired.

As described above, in the energy storage device cell according to the ninth embodiment of the present invention, the through-holes 20a and the through-holes 21a are formed in the capacitor cathode collector foil 20 and the capacitor cathode electrode layer 21, respectively, and the through-holes 20a and the through-holes 21a are filled with the electron insulating metal oxide fine particles 30. Therefore, the possibility that the activated carbon particles may slide off and float to reach the separators, causing electrical short-circuit between the cathode and the anode, can be reduced remarkably.

Further, the capacitor cathode plate member 11 includes the electron insulating metal oxide fine particle layer 31 stacked on the capacitor cathode electrode layer 21 which is provided on the common anode plate member 10 side of the pair of capacitor cathode electrode layers 21 provided on both surfaces of the capacitor cathode collector foil 20. Therefore, the electrical resistance caused by the electron conduction between the common anode plate member 10 and the capacitor cathode plate member 11 is enhanced, and even in the case where inconvenience such as thermal contraction occurs in the separator 12, the electrical short-circuit between the electrodes can be prevented.

In the ninth embodiment, the configuration is described in which the through-holes 20a and 21a are filled with the electron insulating metal oxide fine particles 30, and the electron insulating metal oxide fine particle layer 31 is stacked on the capacitor cathode electrode layer 21. However, the through-holes 20a and 21a may be merely filled with the electron insulating metal fine particles 30. Even in this case, the retention ability for the electrolyte solution can be enhanced, and the possibility that the activated carbon facing the through-holes 20a and 21a slide off can be reduced.

Further, in the eighth and ninth embodiments, alumina is exemplified as the electron insulating metal oxide fine particles 28 and 30. However, fine particles of an inexpensive electron insulating metal oxide with corrosion resistance such as titania or silica may be used.

Tenth Embodiment

Figure 18:
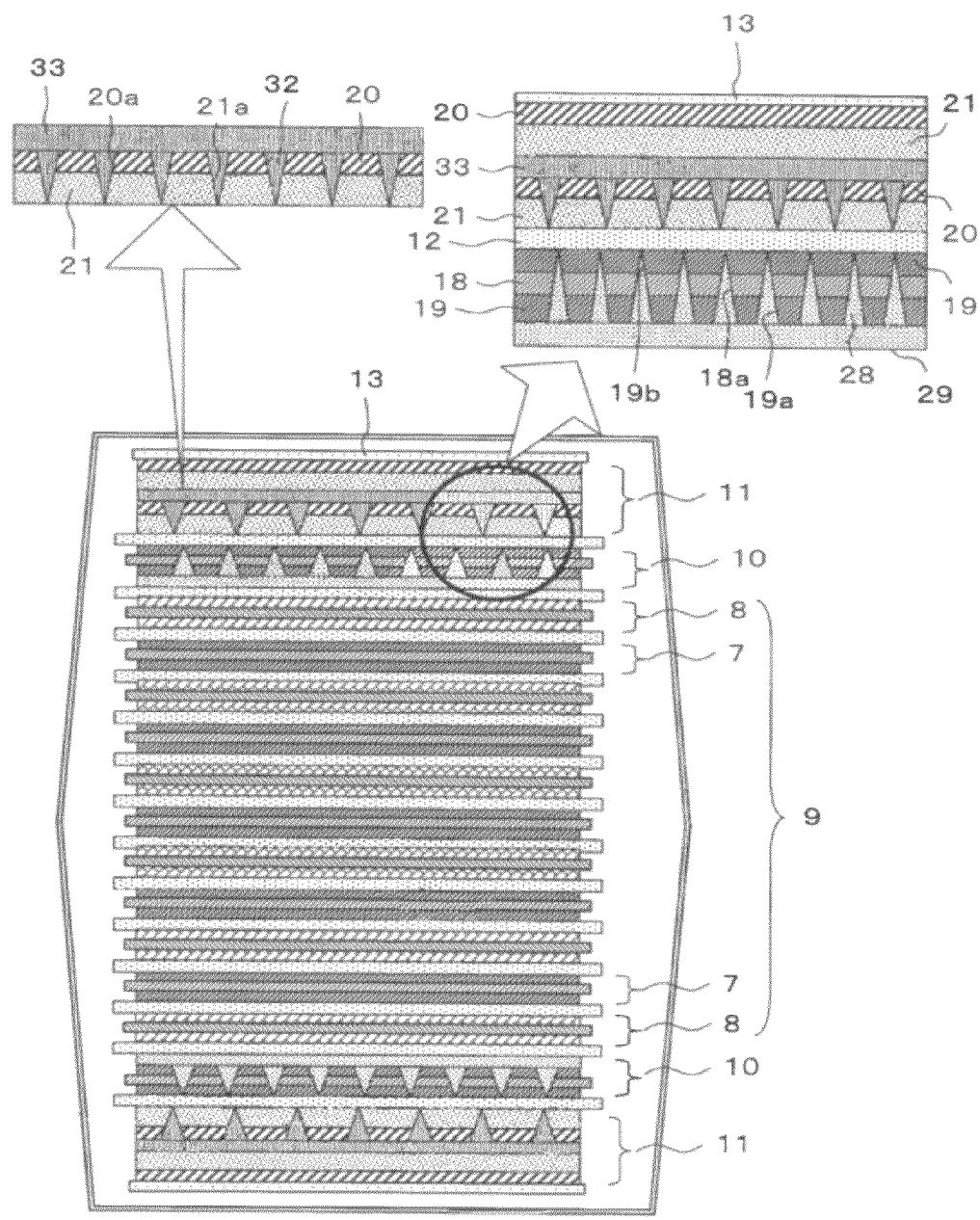
FIG. 18 is a cross-sectional view illustrating an energy storage device cell according to a tenth embodiment of the present invention.

FIG. 18 is a cross-sectional view illustrating an energy storage device cell according to a tenth embodiment of the present invention. In the energy storage device cell according to the tenth embodiment of the present invention, as in the energy storage device cell according to the third embodiment, a capacitor cathode plate member 11 includes two capacitor cathode collector foils 20 and two capacitor cathode electrode layers 21. The capacitor cathode collector foils 20 and the capacitor cathode electrode layers 21 are stacked alternately so that the capacitor cathode electrode layer 21 is stacked on a separator 12 positioned between a common anode plate member 10 and the capacitor cathode plate member 11. Through-holes 20a and through-holes 21a are respectively formed in the capacitor cathode collector foil 20 and the capacitor cathode electrode layer 21 which are placed on the common anode plate member 10 side of the two capacitor cathode collector foils 20 and the two capacitor cathode electrode layers 21. The through-holes 20a and 21a have the same opening area.

The capacitor cathode plate member 11 further includes electron conductive fine particles 32 filling the through-holes 20a and 21a, and an electron conductive fine particle layer 33 stacked on the capacitor cathode collector foil 20 positioned on the common anode plate member 10 side. The electron conductive fine particle layer 33 is placed between the capacitor cathode collector foil 20 positioned on the common anode plate member 10 side and the capacitor cathode collector foil 20 positioned on the outer side in the stack direction of the two capacitor cathode electrode layers 21.

As the electron conductive fine particles 32 and the electron conductive fine particle layer 33, carbon fine particles in which the structure of acetylene black or furnace black is developed to be porous are desired.

An example of the method of forming the electron conductive fine particle layer 33 and the method of filling the through-holes 20a and 21a with the electron conductive fine particles 32 includes a method of, after perforating the capacitor cathode collector foil 20 and the capacitor cathode electrode layer 21, applying a paste containing the electron conductive fine particles 32 to the capacitor cathode collector foil 20 with a roll coater or a die coater so that the paste fills the through-holes 20a and 21a, followed by performing hot-roll pressing. The direction of perforating the capacitor cathode collector foil 20 and the capacitor cathode electrode layer 21 is the inward side of the stack direction.

The ion conductivity can be enhanced by using carbon fine particles in which the structure is developed to be porous as the electron conductive fine particles 32 and the electron conductive fine particle layer 33. Further, due to the porosity, the electron conductive fine particle layer 33 can retain a larger amount of electrolyte solution, and the number of contacts with respect to the capacitor cathode collector foil 20 can be increased to enhance electron conductivity and ion conductivity between the perforated capacitor cathode collector foil 20 and capacitor cathode electrode layer 21 and the outermost capacitor cathode collector foil 20 and capacitor cathode electrode layer 21.

It is not necessary to form through-holes in the outermost capacitor cathode collector foil 20 and capacitor cathode electrode layer 21, and hence the through-holes are not formed in this example. However, the through-holes may be formed. In the case of forming the through-holes in the outermost capacitor cathode collector foil 20 and capacitor cathode electrode layer 21, it is desired to place the electrolyte solution reservoir 13 instead of the electrical insulating sheet 22 for establishing communication of the electrolyte solution. Thus, even in the case where expansion and contraction of the electrolyte occurs due to charging/discharging, the outermost capacitor cathode collector foil 20 and capacitor cathode electrode layer 21 are less likely to run short of the electrolyte solution.

It is desired that the area opening ratio of the through-holes 21a of the capacitor cathode electrode layer 21 be 1% or more and 30% or less. If the area opening ratio is below 1%, there is a fear that the ion conductivity between the front and the back cannot be ensured and the use ratio of the outermost capacitor cathode collector foil 20 and capacitor cathode electrode layer 21 may decrease. On the other hand, if the area opening ratio exceeds 30%, there is a fear that the mechanical strength of the capacitor cathode collector foil 20 may decrease extremely to cause a problem in terms of quality control in the process of production.

As described above, in the energy storage device cell according to the tenth embodiment of the present invention, the capacitor cathode plate member 11 further includes the electron conductive fine particles 32 filling the through-holes 20a which is formed in the capacitor cathode collector foil 20 and the through-holes 21a which is formed in the capacitor cathode electrode layer 21 so as to be overlapped with the through-holes 20a of the capacitor cathode collector foil 20, and hence the capacitor cathode plate member 11 can retain an electrolyte solution.

Further, the area opening ratio of the through-holes 21a of the capacitor cathode electrode layer 21 is 1% or more and 30% or less. Therefore, the ion conductivity between the front and the back of the capacitor cathode collector foil 20 can be ensured, and the mechanical strength of the capacitor cathode collector foil 20 can be ensured.

In the eighth to tenth embodiments, although the configurations of the stack-type energy storage device cells are described, wound-type energy storage device cells may be used.

The structure and method of filling the perforated holes with the electron insulating metal oxide fine particles disclosed in the eighth and ninth embodiments or the structure and method of filling the perforated holes with the electron conductive fine particles disclosed in the tenth embodiment are applicable to storage devices in which through-holes need to be formed in a collector foil called lithium ion capacitor, electrochemical capacitor, or hybrid capacitor, and similar effects can be obtained.

Further, each of the above-mentioned embodiments describes an example in which the battery anode electrode layer 15 and the common anode electrode layer 19 are formed of carbon fine particles to be used in a lithium secondary battery, such as graphite, hard carbon, amorphous carbon, a mesocarbon microbeads graphite. However, the battery anode electrode layer 15 and the common anode electrode layer 19 may contain lithium titanate coated with carbon as a main component. A copper foil can be prevented from being eluted by using an aluminum foil for the battery anode collector foil 14 and the common anode collector foil 18. Further, the lithium ion capacitor portions can be kept at 0 V stably. As a result, even when the cell voltage is set to 0 V, the degradation of the lithium ion battery portion can be suppressed, and the safety of the energy storage device cell can be enhanced.

Lithium titanate is kept at a higher potential, compared with that in the case of using carbon such as graphite. Therefore, an aluminum foil can be used for the battery anode collector foil 14 and the common anode collector foil 18, instead of a copper foil. The copper foil has a fear of elution when the potential increases, but the aluminum foil has no fear of elution. Further, during discharging of the energy storage device cell, the potential difference between a cathode and an anode decreases, and further, the common anode portion is short of lithium ions compared with the lithium ion battery anode portion. Therefore, the potential of the common anode portion becomes higher than that of the lithium ion battery anode portion. Thus, the potential difference between the lithium ion capacitor cathode portion and the common anode portion decreases further, and the degradation of the lithium ion battery portions is suppressed even when the cell voltage is set to 0 V, and the safety of the energy storage device cell can be enhanced.

What is claimed is:
1. An energy storage device cell, comprising:
a lithium ion battery main body including:
   a lithium ion battery anode portion including a battery anode collector foil and battery anode electrode layers provided on both surfaces of the battery anode collector foil; and
   a lithium ion battery cathode portion including a battery cathode collector foil and battery cathode electrode layers provided on both surfaces of the battery cathode collector foil,
a plurality of the lithium ion battery anode portions and a plurality of the lithium ion battery cathode portions are alternately stacked so that the lithium ion battery cathode portion is placed at an end in a stack direction of the lithium ion battery main body;
a common anode portion including a common anode collector foil having a through-hole formed therein and common anode electrode layers provided on both surfaces of the common anode collector foil, the common anode portion being stacked on the lithium ion battery cathode portion placed at the end in the stack direction of the lithium ion battery main body;
a lithium ion capacitor cathode portion including a capacitor cathode collector foil and a capacitor cathode electrode layer provided on the capacitor cathode collector foil, the lithium ion capacitor cathode portion being stacked on the common anode portion so that the capacitor cathode electrode layer is placed between the common anode portion and the capacitor cathode collector foil;
separators provided respectively between the lithium ion battery anode portions and the lithium ion battery cathode portions, between the lithium ion battery cathode portion and the common anode portion, and between the common anode portion and the lithium ion capacitor cathode portion; and
a container containing the lithium ion battery main body, the common anode portion, the lithium ion capacitor cathode portion, and the separators,
wherein the battery anode collector foil and the common anode collector foil are connected to each other electrically,
wherein the battery cathode collector foil and the capacitor cathode collector foil are connected to each other electrically,
wherein each of a first subset of the common anode electrode layers provided on a lithium ion battery main body side has a through-hole formed therein that overlaps with the through-hole formed in the common anode collector foil,
wherein a surface of each of a second subset of the common anode electrode layers provided on a common anode collector foil side and a lithium ion capacitor cathode portion side has a concave portion formed therein that is opposed to the through-hole formed in the common anode collector foil, and
wherein the common anode portion further includes electron insulating metal oxide fine particles filling the through-hole of the common anode collector foil, the through-holes of each of the first subset of the common anode electrode layers, and the concave portions of each of the second subset of the common anode electrode layers
wherein the common anode portion further includes an electron insulating metal oxide fine particle layer stacked on each of the first subset of common anode electrode layers provided on the lithium ion battery main body side.

2. The energy storage device cell according to claim 1, wherein each of the plurality of lithium ion battery anode portions and each of the plurality of the lithium ion battery cathode portions is formed in a plate shape.

3. The energy storage device cell according to claim 1,
wherein the plurality of the lithium ion battery anode portions constitute a band-shaped lithium ion battery anode band member,
wherein the plurality of the lithium ion battery cathode portions constitute a band-shaped lithium ion battery cathode band member, and
wherein the lithium ion battery anode band member and the lithium ion battery cathode band member are wound while being stacked on each other.

4. The energy storage device cell according to claim 1,
wherein a plurality of capacitor cathode collector foils and a plurality of capacitor cathode electrode layers are alternately stacked, and
wherein at least one of the plurality of capacitor cathode collector foils, which is placed on the common anode portion side with respect to one of the plurality of capacitor cathode electrode layers positioned farthest from the common anode portion, has a through-hole formed therein.

5. The energy storage device cell according to claim 1,
wherein a plurality of capacitor cathode electrode layers are provided on both surfaces of the capacitor cathode collector foil, and
wherein the capacitor cathode collector foil has a through-hole formed therein.

6. The energy storage device cell according to claim 4, wherein the lithium ion capacitor cathode portion further includes electron conductive fine particles filling the through-hole which is formed in the at least one capacitor cathode collector foil, and
a through-hole is formed in at least one of the plurality capacitor cathode electrode layers so as to be overlapped with the through-hole formed in the at least one capacitor cathode collector foil.

7. The energy storage device cell according to claim 1, wherein an area opening ratio of the through-hole of at least one of the first subset of the common anode electrode layers falls within an inclusive range of 0.01% through 0.1%.

8. The energy storage device cell according to claim 6, wherein an area opening ratio of the through-hole of the at least one capacitor cathode electrode layer is 1% or more and 30% or less.

* * * * *